United States Patent
Juman et al.

(10) Patent No.: US 6,567,363 B1
(45) Date of Patent: May 20, 2003

(54) OPTICAL DATA RECORDING AND REPRODUCING APPARATUS WITH EASILY ASSEMBLED COMPONENTS

(75) Inventors: Shigeru Juman, Kawasaki (JP); Soichi Shimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/538,638

(22) Filed: Mar. 30, 2000

(30) Foreign Application Priority Data

Mar. 30, 1999 (JP) .......................................... 11-089694

(51) Int. Cl.[7] .............................................. G11B 33/02
(52) U.S. Cl. ..................................................... 369/77.2
(58) Field of Search ................................ 369/77.2, 77.1, 369/44–46, 48–51

(56) References Cited

U.S. PATENT DOCUMENTS

| | | | | |
|---|---|---|---|---|
| 5,274,619 A | * | 12/1993 | Suzuki | 369/30.78 |
| 5,323,371 A | * | 6/1994 | Nagase et al. | 360/133 |
| 5,444,690 A | | 8/1995 | Childers, III et al. | 369/263 |
| 5,539,710 A | * | 7/1996 | Tokushuku et al. | 369/126 |
| 5,694,314 A | | 12/1997 | Aoki et al. | 369/77.2 |
| 5,768,240 A | * | 6/1998 | Hiraga | 369/75.2 |
| 6,178,149 B1 | * | 1/2001 | Nakamura et al. | 360/99.06 |
| 6,388,972 B1 | * | 5/2002 | Saitou et al. | 369/75.2 |
| 6,442,123 B1 | * | 8/2002 | Nishimoto | 369/112.01 |

FOREIGN PATENT DOCUMENTS

| | | |
|---|---|---|
| JP | 4121833 | 4/1992 |
| JP | 5250704 | 9/1993 |
| JP | 573745 | 10/1993 |
| JP | 6215474 | 8/1994 |
| JP | 7210878 | 8/1995 |
| JP | 8017135 | 1/1996 |
| JP | 8106774 | 4/1996 |
| JP | 9082079 | 3/1997 |
| JP | 9223353 | 8/1997 |
| JP | 9293325 | 11/1997 |
| JP | 10149641 | 6/1998 |
| JP | 10188462 | 7/1998 |

* cited by examiner

*Primary Examiner*—Hoa T. Nguyen
*Assistant Examiner*—Dzung C. Nguyen
(74) *Attorney, Agent, or Firm*—Greer, Burns & Crain, Ltd.

(57) ABSTRACT

The present invention is intended to produce an optical disk drive unit, which is an optical data recording and reproducing apparatus, compactly and to improve the efficiency in assembling components of the drive unit. The optical disk drive unit consists of a driving mechanism and a printed wiring board. The driving mechanism assists in loading a cartridge, which accommodates an optical disk that is a commutative medium, in a main unit, drives the cartridge, and reads or writes data from or on the optical disk. A circuit for driving and controlling the driving mechanism is mounted on the printed wiring board. The driving mechanism can be divided into a load/ejection mechanism and a reading/writing mechanism. The load/ejection mechanism is a united body consisting of a cartridge identification sensor, an ejection motor for ejecting a cartridge, and a bias magnet assembly. The reading/writing mechanism is a united body consisting of a movable optical assembly including a spindle motor and a carriage and a stationary optical assembly.

11 Claims, 23 Drawing Sheets

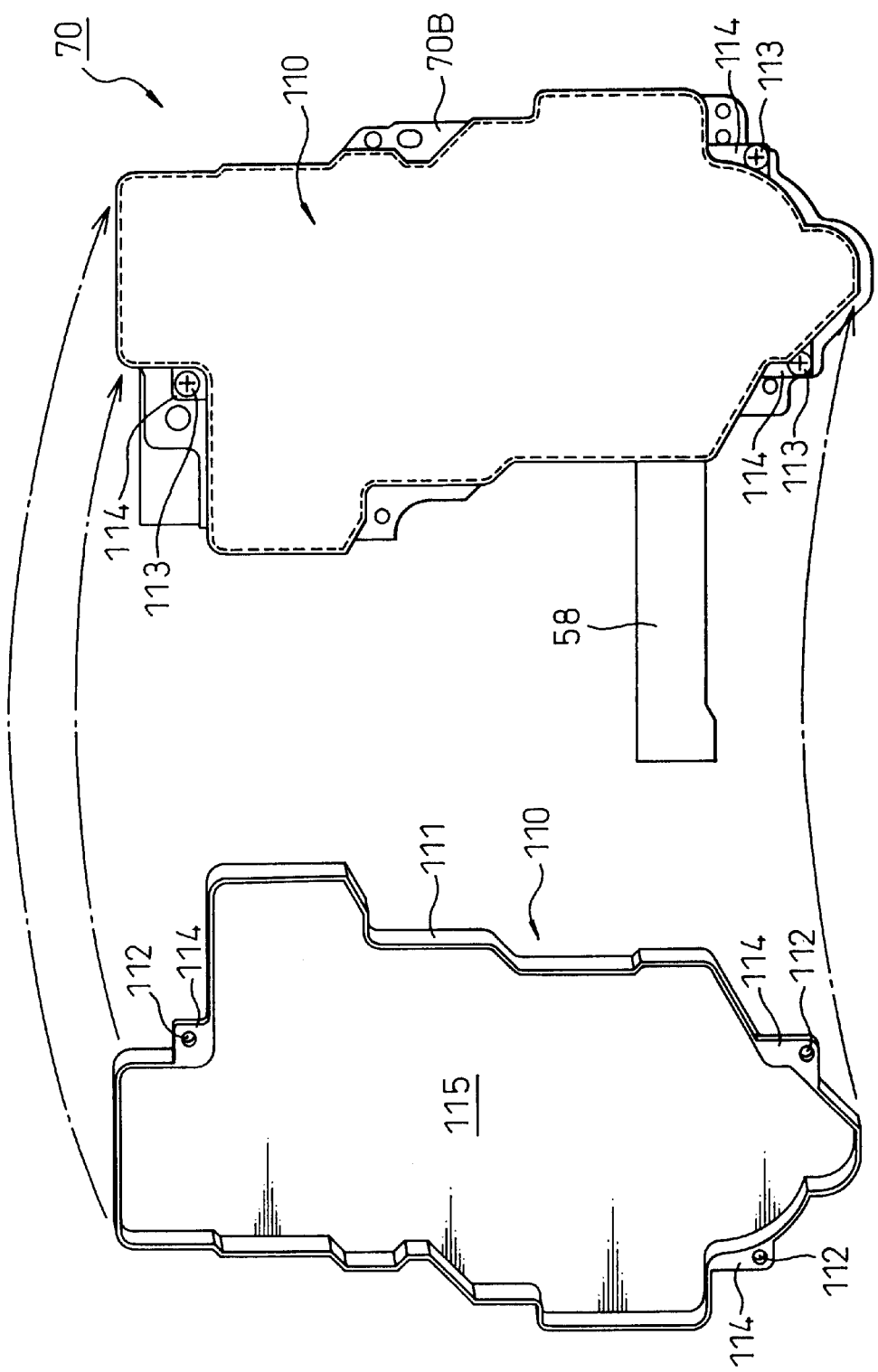

OPTICAL DATA RECORDING AND REPRODUCING APPARATUS WITH EASILY ASSEMBLED COMPONENTS

BACKGROUND OF THE INVENTION

1. Field of the Invention

The present invention relates to an optical data recording and reproducing apparatus, or more particularly, to an optical disk drive unit whose components can be assembled easily.

2. Description of the Related Art

In recent years, the processing abilities and processing speeds of personal computers have improved and the storage capacities thereof, for programs including an operating system and application software and for data, have increased. Under these circumstances, storage devices are required to be compact and cost low. Besides, there is an increasing demand for a larger storage capacity and a higher reading/writing speed.

Optical disk drive units, or in other words, optical data recording and reproducing apparatuses, have come to prevail as storage devices capable of meeting the requirements for compact design, low cost, large storage capacity, and a high reading/writing speed. The optical disk drive unit converges laser light on an optical disk and records information on the optical disk by utilizing the heat generated. Moreover, optical disks compatible with this type of optical disk drive unit are generally encapsulated in a cartridge. When an optical disk is inserted into the optical disk drive unit for the purpose of use, a shutter of the cartridge is opened. The hub of the optical disk is engaged with a turntable of a spindle motor mounted in the optical disk drive unit, whereby the optical disk is rotated. Along with the spread of the optical disk drive unit using an optical disk cartridge, ease in assembling components, stability and reliability in performance, and reduction in cost are in great demand these days.

The structures and mechanisms described below are adopted in a conventional optical disk drive unit designed to accept an optical disk cartridge.

(1) A structure for mounting a load/ejection mechanism, of which components need not be assembled highly precisely, on a reading/writing mechanism whose components must be assembled highly precisely.

(2) A structure for linking the reading/writing mechanism and load/ejection mechanism with a flexible cable or cable. Herein, a printed wiring board having a circuit for controlling the mechanisms mounted thereon is included independently of the reading/writing mechanism and load/ejection mechanism.

(3) A structure for detecting the internal temperature of a housing using a temperature sensor and setting the conditions for reading or writing data. The structure is used to detect the temperature of a medium, which is an optical disk, affecting writing of data onto an optical disk.

(4) A structure for detecting the home position of a carriage, wherein a sensor for detecting the home position of the carriage included in a movable optical assembly is incorporated in the housing.

(5) A structure for accurately aligning a center yoke with a side yoke constituting each of several magnetic circuits included in the movable optical assembly.

(6) A mechanism for adjusting the slope of an objective so that the optical axis of the objective mounted on the carriage will lie perpendicular to the surface of the turntable of the spindle motor.

(7) A structure for positioning a stationary optical assembly independently of the reading/writing mechanism, load/ejection mechanism, and printed wiring board. The stationary optical assembly includes a source of laser light incident on an optical disk, a light detector, and a light passage which guides laser light to an optical disk, splits light reflected from an optical disk and guides the split reflected light to the light detector.

(8) A structure having a switch for judging the type of cartridge, or specifically, whether a cartridge is an optical disk cartridge having a magneto-optical disk on which data can be written, or whether a cartridge is a cleaning cartridge.

The present applicant has filed an application for an optical disk drive unit having the foregoing structures and it has been granted a patent as U.S. Pat. No. 5,694,314 (comparable to Japanese Unexamined Patent Publication No. 7-210878).

However, the optical disk drive unit has drawbacks to be overcome as described below.

(1) The load/ejection mechanism is attached to the reading/writing mechanism that is produced highly precisely at a preceding step. There is a possibility that the precision in assembling attained at the preceding step may be impaired due to the assembling work performed at the succeeding step. Moreover, the reading/writing mechanism and load/ejection mechanism cannot be handled mutually independently. This leads to time-consuming assembling and repairing steps.

(2) Since the reading/writing mechanism, load/ejection mechanism, and printed wiring board are connected by the flexible cable or cable, the flexible cable or cable has a plurality of nodes. This leads to time-consuming assembling work. A decrease in the number of nodes is required.

(3) The temperature sensor is not located near an optical disk. The temperature of a medium that is the optical disk is calculated from a temperature value detected by the sensor. The precision in the detected medium temperature is therefore insufficient. The conditions for reading and writing data must be set more precisely.

(4) The home position sensor for detecting the home position of the carriage included in the movable optical assembly is incorporated independently in the housing. A dedicated cable and connector are therefore needed for transmitting a detection signal output from the sensor to the printed wiring board. This leads to a higher cost.

(5) Conventionally, the center yoke and side yoke are aligned with each other using a pin and notch. The outer dimensions of the magnetic circuit must be increased in order to ensure a large area for the joint between the yokes.

(6) The slope of the objective mounted on the carriage is adjusted so that the optical axis of the objective becomes perpendicular to the surface of an optical disk. Since the adjusted part is a movable part, the adjustment is hard to do. Moreover, since the structure required for adjustment is included in the carriage, the carriage becomes heavy.

(7) Since the stationary optical assembly is included independently of the reading/writing mechanism, it is necessary to align the optical axis of the stationary optical assembly with the optical axis of the reading/writing mechanism. Thus, assembling efficiency is poor.

(8) A switch for identifying a cleaning cartridge is also needed.

SUMMARY OF THE INVENTION

Accordingly, an object of the present invention is to provide an optical data recording and reproducing apparatus, that is an optical disk drive unit, capable of meeting several requirements. The requirements include: (1) simplification of assembling and repairing steps; (2) decrease in the number of junctions between a mechanism and a printed-circuit board; (3) improvement of precision in detecting the temperature of a medium that is an optical disk; (4) reduction in cost; (5) compactness in the design of a magnetic circuit; (6) reduction in the weight of a carriage; (7) improvement of efficiency in assembling components of a stationary optical assembly; and (8) decrease in the number of switches.

The constituent features of the present invention for accomplishing the above object will be described below.

According to the first aspect of the present invention, there is provided an optical data recording and reproducing apparatus for optically recording or reproducing information on or from a commutative medium. The optical data recording and reproducing apparatus consists of a driving mechanism and a printed wiring board. The driving mechanism assists in loading a cartridge, in which a commutative medium is incorporated, into a main unit, drives the commutative medium, and reads or writes data from or onto the commutative medium. A control circuit for driving and controlling the driving mechanism is mounted on the printed wiring board. The driving mechanism can be divided into a load/ejection mechanism and a reading/writing mechanism. The load/ejection mechanism is a united body consisting of at least a sensor for identifying a cartridge, an ejection motor for ejecting the cartridge from the main unit, and a bias magnet assembly. The reading/writing mechanism is a united body consisting of at least a movable optical assembly and a stationary optical assembly. The movable optical assembly includes a spindle motor for rotating a commutative medium and a carriage for optically accessing the commutative medium. The stationary optical assembly is optically connected to the movable optical assembly.

According to the first aspect, the load/ejection mechanism and reading/writing mechanism can be separated from each other and can therefore be produced at mutually independent assembling steps. This leads to a simplified production line. The reading/writing mechanism is merely attached to the load/ejection mechanism at a succeeding step. Therefore a part adjusted at a preceding step is not disordered.

According to the second aspect of the present invention, based on the first aspect thereof, a signal line used to drive a carriage included in the reading/writing mechanism and a signal line used to drive the spindle motor are integrated into a flexible cable or cable. The flexible cable or cable is then linked to the printed wiring board.

According to the second aspect, only one electrical interface is interposed between the reading/writing mechanism and printed wiring board. This contributes to an improvement in assembling efficiency and a decrease in the number of parts.

According to the third aspect of the present invention, based on the first aspect, a temperature sensor for detecting the internal temperature of the apparatus is included in a spindle motor assembly of the reading/writing mechanism.

According to the third aspect, the temperature sensor is mounted on a seating of the spindle motor included in the spindle motor assembly. This leads to saving of spaces and decrease in the number of parts. Moreover, the spindle motor is located near an optical disk. The temperature of a medium, essential in controlling the conditions for recording, can be detected accurately.

According to the fourth aspect of the present invention, based on the first aspect, a position sensor for detecting the home position of the carriage included in the movable optical assembly is mounted on the spindle motor assembly included in the reading/writing mechanism.

According to the fourth aspect, the home position sensor is mounted on the seating of the spindle motor included in the spindle motor assembly. This leads to saving of space and a decrease in the number of parts.

According to the fifth aspect of the present invention, based on the first aspect, magnetic circuits are used to drive the carriage, which is included in the movable optical assembly, in directions along tracks on a commutative medium within the reading/writing mechanism. Each magnetic circuit is composed of a center yoke and a side yoke having a permanent magnet attached thereto. The center yoke is fixed to the base of the reading/writing mechanism using screws. The portions of the side yoke that join the center yoke each have a concave part in which the head of the screw is stowed. The side yoke is aligned with the center yoke using the heads of the screws.

According to the fifth aspect, the heads of the screws are used to align the yokes with each other. Consequently, a contact area at which the yokes are in contact with each other can be made large without the necessity of increasing the outer dimension of each magnetic circuit. Consequently, saturation in the magnetic circuit can be prevented.

According to the sixth aspect of the present invention, based on the first aspect, a mechanism is included for fixing the spindle motor to the base of the reading/writing mechanism at three points. The fixing mechanism consists of three legs, screw holes, a reference plane, and three pairs of pressurizing members and screws having the same sizes. The three legs are jutted out equidistantly from the seating of the spindle motor, and each have a screw passage hole bored therein. The screw holes are bored in the base of the reading/writing mechanism to be opposed to the screw passage holes of the legs. The reference plane is formed around one of the screw holes bored in the base. One of the three legs is higher by the height of the pressurizing members than the others. The one leg is regarded as a reference point in a height direction, matched with the reference plane, and then mounted on the base while being pressurized with the pressurizing member and screw. The other two legs are screwed to the base with the pressurizing members between the legs and base. The magnitude of tightening the two screws is adjusted, whereby the slope of the turntable of the spindle motor can be adjusted in the course of manufacturing the optical data recording and reproducing apparatus.

According to the seventh aspect of the present invention, based on the sixth aspect, the screw passage holes bored in the three legs are such that a triangle drawn with the centers of the screw passage holes as vertices thereof is an isosceles triangle. The isosceles triangle has the center of the screw passage hole in the reference plane as a vertex thereof.

According to the eighth aspect of the present invention, based on the sixth aspect, the screw passage holes bored in the three legs are such that a triangle drawn with the centers of the screw passage holes as vertices is an equilateral triangle. The equilateral triangle has the center of rotation of the spindle motor as the center of gravity thereof and has the center of the screw passage hole in the reference plane as a vertex thereof.

According to the sixth to eighth aspects of the present invention, the slope of the objective mounted on the carriage relative to an optical disk can be adjusted during mounting of the spindle motor on the reading/writing mechanism. This results in a simplified manufacturing process.

According to the ninth aspect of the present invention, based on the first aspect, the stationary optical assembly of the reading/writing mechanism consists of a laser diode, a collimator lens, a beam splitter, a Wollaston prism, a condenser lens, and a sensor. The base of the reading/writing mechanism is dented in the form of letter L. The laser diode, collimator lens, and beam splitter are placed in a dent extending in a moving direction in which the carriage moves. The Wollaston prism, condenser lens, and sensor are placed in a dent formed in a direction orthogonal to the moving direction of the carriage.

According to the tenth aspect of the present invention, based on the ninth embodiment, the base is post-machined in order to form planes, of which dimensions are accurate, in the L-shaped dent. The collimator lens and condenser lens are placed on the planes whose dimensions are accurate.

According to the ninth and tenth aspects of the present invention, the stationary optical assembly can be highly precisely united with the reading/writing mechanism. The optical axes of the reading/writing mechanism and stationary optical assembly can be adjusted during construction of the reading/writing mechanism. This leads to improvement in assembling efficiency.

According to the eleventh aspect of the present invention, based on the first aspect, the cartridge type judgment sensor is not included in the load/ejection mechanism. Instead, a judging means is included in the control circuit on the printed wiring board for controlling the number of rotations of the spindle motor in the reading/writing mechanism. The judging means judges a completion time at which activation of the spindle motor is completed after a cartridge is inserted into the load/ejection mechanism. When the spindle motor activation completion time is too short, the judging means recognizes that the inserted cartridge is a cleaning cartridge.

According to the eleventh aspect, the switch for identifying the cleaning cartridge is unnecessary. This leads to a saving of space and a decrease in the number of parts.

BRIEF DESCRIPTION OF THE DRAWINGS

The present invention will be more clearly understood from the description as set forth below with reference to the accompanying drawings, wherein:

FIG. 12B is a bottom view of the reading/writing mechanisms shown in FIG. 12A covered with a metal cover as shown aside in accordance with the present invention;

DESCRIPTION OF THE PREFERRED EMBODIMENTS

Before describing the preferred embodiments, an explanation will be given of the conventional optical storage device using an optical disk shown in FIGS. 1 to 6B.

Figure 1:
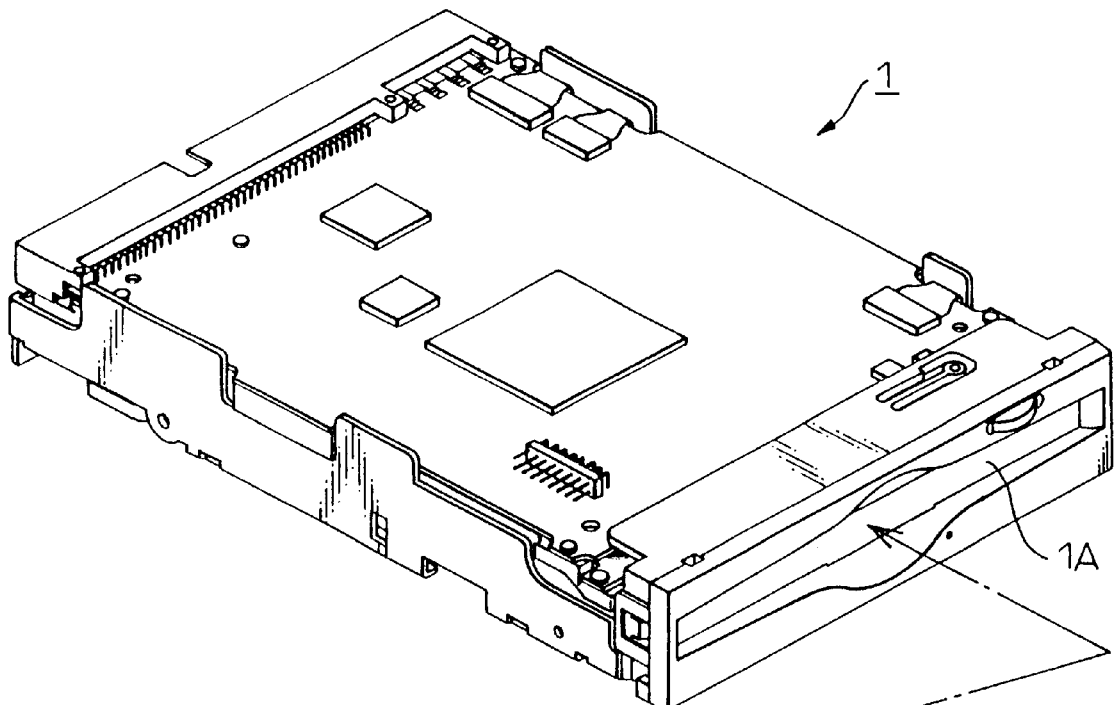
FIG. 1 is an oblique top view showing the appearance of a conventional optical disk drive unit.
Figure 1:
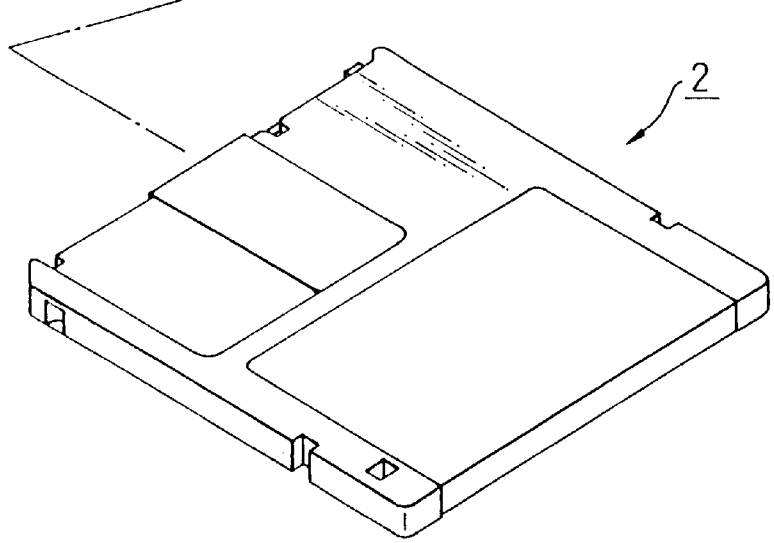

FIG. 1 shows the appearance of a conventional optical disk drive unit. An optical disk cartridge 2, that is a cartridge having an optical disk stowed therein, is inserted into the optical disk drive unit 1. The optical disk drive unit 1 reads or writes data from or on the optical disk in the optical disk cartridge 2. A load/ejection mechanism for loading or ejecting the optical disk cartridge 2, a spindle motor for rotating the optical disk, a bias mechanism, a positioner, a lens actuator, and a stationary optical system are incorporated in the optical disk drive unit 1. The optical disk cartridge 2 is inserted into the optical disk drive unit 1 through a slot 1A of the optical disk drive unit 1.

Figure 2:
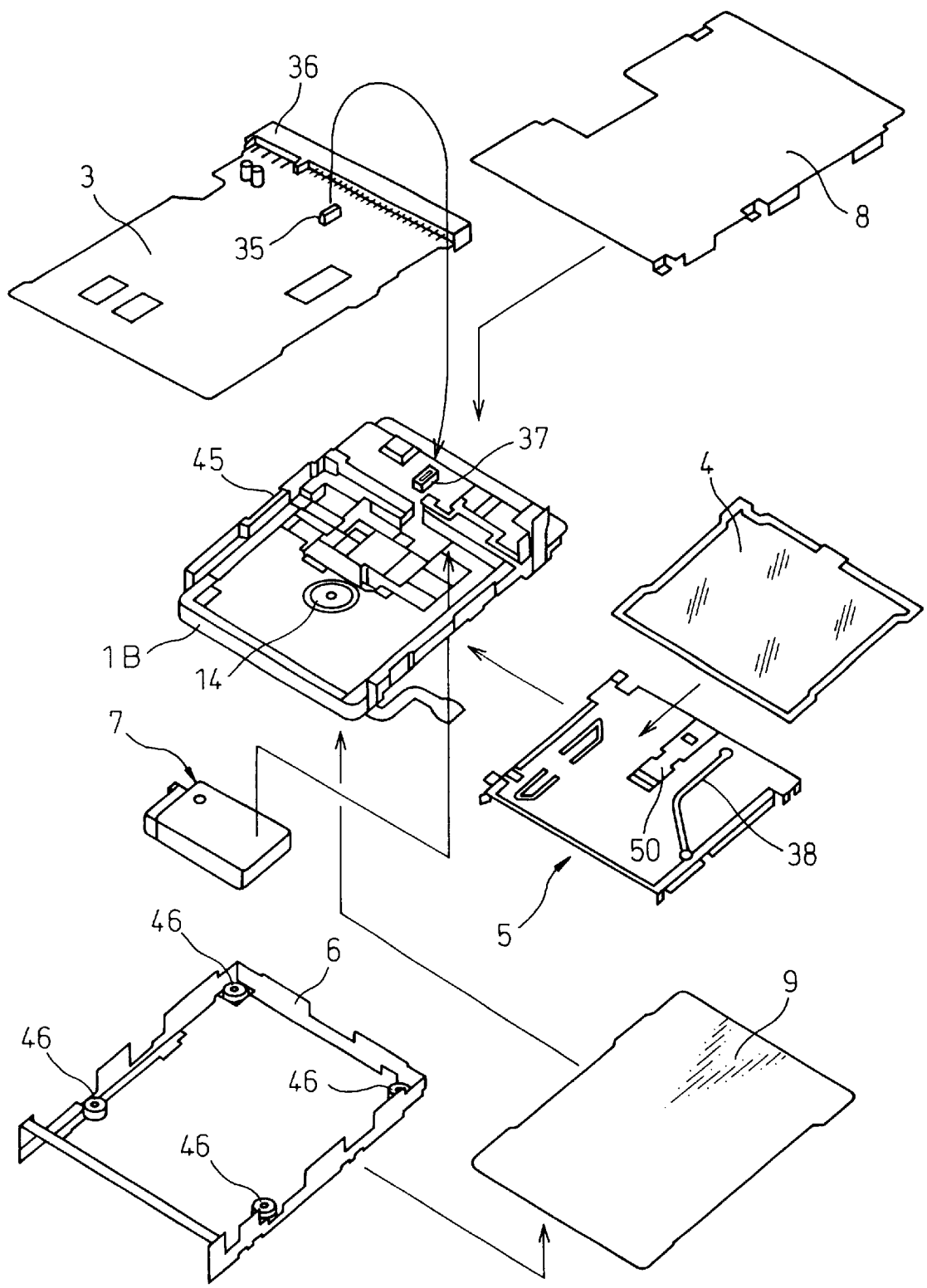
FIG. 2 is an exploded oblique view of the optical disk drive unit shown in FIG. 1.

FIG. 2 is an exploded view showing the components of the conventional optical disk drive unit 1 shown in FIG. 1. The conventional optical disk drive unit 1 has a drive base 1B, a printed wiring board 3, an insulation sheet 4, an optical disk cartridge loading assembly 5 (hereinafter, simply, a disk loading assembly), a frame 6, a stationary optical assembly 7, a top cover 8, and a bottom cover 9. A spindle motor 14, a movable optical assembly 45, and a connector 37 are mounted on the drive base 1B. The spindle motor 14 rotates the optical disk in the optical disk cartridge 2 shown in FIG. 1. The movable optical assembly 45 reads data from the optical disk. The connector 37 is attached to a counterpart on the printed wiring board 3. The spindle motor 14 and movable optical assembly 45 must be assembled highly precisely. The drive base 1B is therefore constructed precisely at a previous step.

A drive circuit for driving the optical disk drive unit is mounted on the surface of the printed wiring board 3 which is not shown. A connector 35 to be attached to the connector 37 formed on the drive base 1B is formed on the back of the printed wiring board 3. The printed wiring board 3 shown in FIG. 2 is attached upside down to the drive base 1B. The printed wiring board 3 is then shielded with the top cover 8. A connector 36 formed on an edge of the printed wiring board 3 is used to connect the optical disk drive unit to an external apparatus.

The disk loading assembly 5 has an open/close arm 38 for opening or closing a shutter of the optical disk cartridge 2, and a bias magnet assembly 50 for generating a magnetic field at the time of writing data on an optical disk. The disk loading assembly 5 is interposed between the printed wiring board 3 and drive base 1B with the insulation sheet 4 placed on the disk loading assembly. Moreover, the stationary optical assembly 7 is mounted on the lower surface of the drive base 1B and sealed with the bottom cover 9. The drive base 1B on which the printed wiring board 3, insulation sheet 4, disk loading assembly 5, stationary optical assembly 7, top cover 8, and bottom cover 9 are attached is placed on vibration-proof rubbers 46 put on the frame 6. The drive base 1B is then fixed to the frame 6 using screws or the like.

As mentioned above, the disk loading assembly 5, that is a load/ejection mechanism, is attached to the drive base 1B that has a reading/writing mechanism constructed highly precisely at a preceding step. In the conventional optical disk drive unit 1, therefore, the assembling precision attained at the preceding step cannot be maintained. Moreover, assembling and repairing steps are time-consuming.

Figure 3:
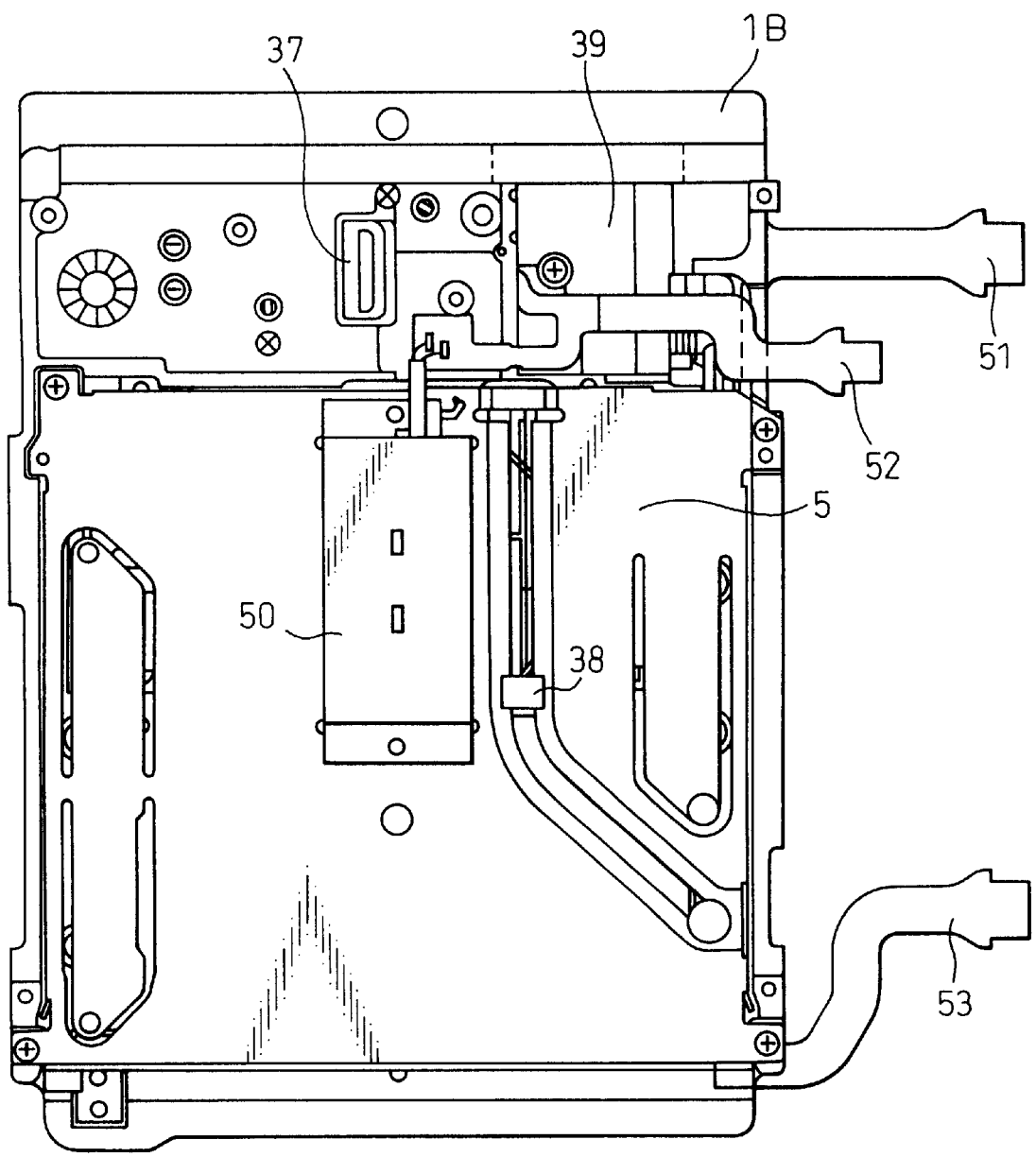
FIG. 3 is a plan view showing the optical disk drive unit, which is shown in FIG. 2, with a drive base, a disk loading assembly, and a stationary optical assembly assembled.

FIG. 3 shows the conventional optical disk drive unit 1, which is shown in FIG. 2, with only the drive base 1B, disk loading assembly 5, and stationary optical assembly 7 assembled. Specifically, the disk loading assembly 5 has the open/close arm 38 and bias magnet assembly 50. The drive base 1B has the connector 37. In FIG. 3, an ejection motor 39 is mounted on the drive base 1B. The ejection motor 39 ejects an optical disk cartridge from the disk loading assembly 5. Also shown in FIG. 3 are flexible printed-circuit boards (FPC boards) 51, 52, and 53. The FPC board 51 transfers signals to or from a carriage that will be described later. The FPC board 52 transfers signals to or from the ejection motor 49 and bias magnet assembly 50. The FPC board 53 transfers signals to or from the spindle motor that will be described later.

Conventionally, the three FPC boards 51, 52, and 53 are needed. Many joints are therefore present. This leads to time-consuming assembling work.

Figure 4:
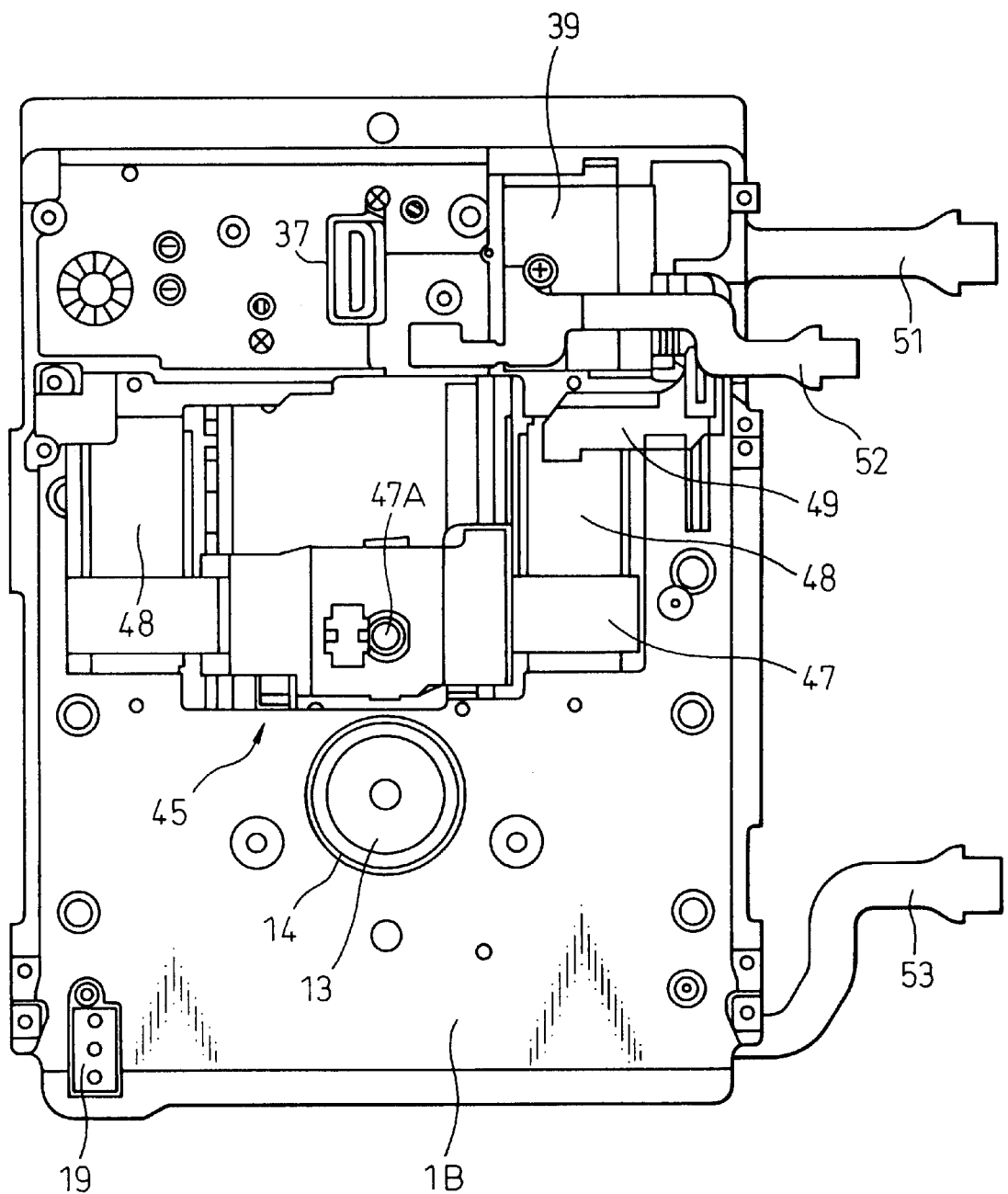
FIG. 4 is a plan view showing the optical disk drive unit, which is shown in FIG. 3, with the disk loading assembly removed therefrom.

FIG. 4 shows the optical disk drive unit with the disk loading assembly 5 removed from the state shown in FIG. 3. The portion of the drive base 1B hidden behind the disk loading assembly 5 includes the spindle motor 14, the movable optical assembly 45, and an ejection lever 49 to be driven by the ejection motor 39. The spindle motor 14 is crowned with a turntable 13. The turntable 13 engages with the hub of an optical disk to thus rotate the optical disk. Moreover, the movable optical assembly 45 includes a carriage 47 that moves along magnetic circuits 48. An objective 47A for irradiating laser light to an optical disk is mounted in the carriage 47. A cartridge identification switch 19 for detecting the type of optical disk cartridge is located on one side of the slot (lower side of FIG. 4) of the drive base 1B through which the optical disk cartridge is inserted.

Figure 5:
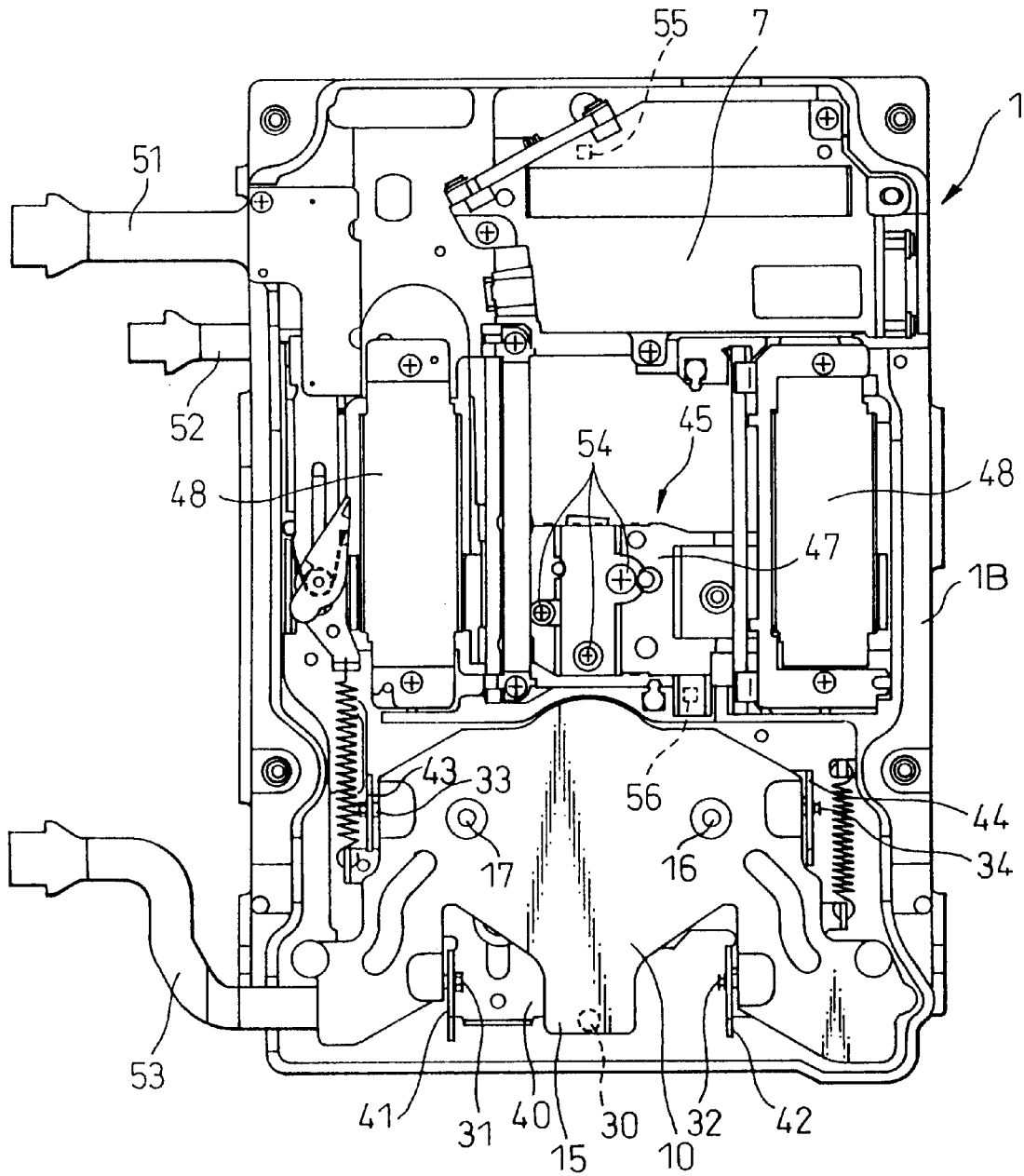
FIG. 5 is a bottom view showing the back of the optical disk drive unit shown in FIG. 4.

FIG. 5 shows the back of the drive base 1B shown in FIG. 4. The spindle motor 14 is attached to a lifter plate 10. A lifting mechanism for lifting or lowering the lifter plate 10 is mounted on the back of the drive base 1B. When no optical disk cartridge is inserted into the conventional optical disk drive unit 1, the spindle motor 14 is hidden behind the top of the drive base 1B. When an optical disk cartridge is loaded in the disk loading assembly 5, the spindle motor 14 juts out of the top of the drive base 1B, owing to the lifting mechanism, and is coupled to the optical disk cartridge.

Figure 6A:
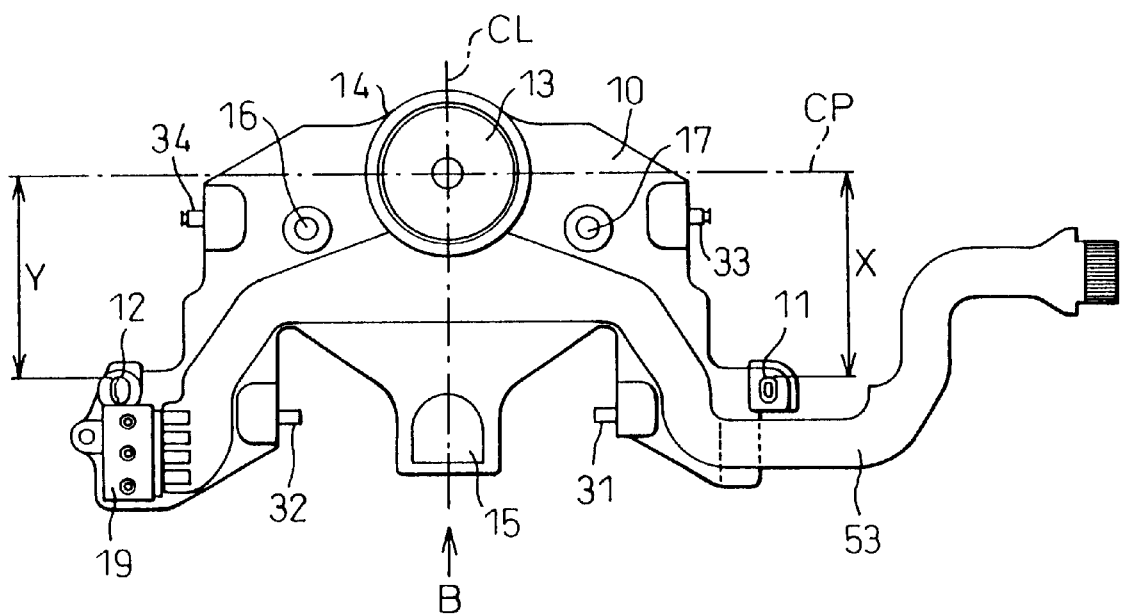
FIG. 6A is a plan view detailing a spindle motor shown in FIG. 5.
Figure 6B:
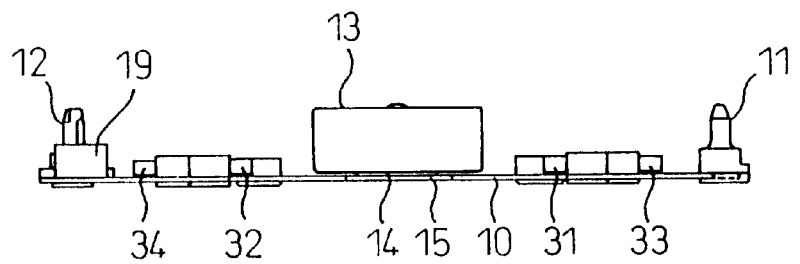
FIG. 6B is a front view detailing the spindle motor shown in FIG. 5.

FIG. 6A and FIG. 6B show the spindle motor 14, lifter plate 10, and other parts employed in the conventional optical disk drive unit. The lifter plate 10 is formed with a magnetic member such as an iron plate. An extended portion 15 is extended from the center of the liter plate 10 towards the slot through which an optical disk cartridge is inserted. A first alignment pin 11 and a second alignment pin 12 jut out from the lifter plate 10. When the lifter plate 10 rises to reach the back of the base 1B, the first alignment pin 11 invades into a path of an optical disk cartridge on the top of the base 1B and passes through an oblong reference hole bored in the optical disk cartridge. The second alignment pin 12 passes through a round reference hole. The spindle motor 14 having the turntable 13 that is chucked to the hub of an optical disk is mounted on the lifter plate 10. Guide holes 16 and 17 for guiding the rising or descending of the lifter plate 10 are bored in the lifter plate 10. The flexible printed-circuit board 53 and the cartridge identification switch 19 are mounted on the lifer plate 10. Guide pins 31 to 34 for helping the lifter plate 10 rise or descend jut out from the lifter plate 10.

The cartridge identification switch 19 detects the location of a write-protect tab of an optical disk cartridge and identifies a cleaning cartridge. The guide pins 31 and 32 are mutually symmetrical relative to a center line CL passing through the center of rotation of the spindle motor 14 in the same direction as an inserting direction in which an optical disk cartridge is inserted. Likewise, the guide pins 33 and 34 are mutually symmetrical relative to the center line CL. In the lifter plate 10 of this example, a distance X from a line CP passing through the center of rotation of the spindle motor 14 perpendicularly to the center line CL to the end of the first alignment pin 11 is larger than a distance Y from the line CP to the end of the second alignment pin 12.

The lifter plate 10 has, as shown in FIG. 5, the two guide holes 16 and 17 into which posts formed on the base 1B are fitted. The guide pins 31 to 34 jut out from the lifter plate 10 are fitted into first to fourth brackets 41 to 44 attached to a load plate 40. The load plate 40 is designed to move to the for end of the optical disk drive unit 1 when an optical disk cartridge is inserted into the optical disk drive unit 1. Therefore, when an optical disk cartridge is inserted into the optical disk drive unit 1, the load plate 40 moves to the front side (upward in FIG. 5) of the base 1B. At this time, the guide pins 31 to 34 jutting out of the lifter plate 10 are lifted to the back of the base 1B owing to the brackets 41 to 44. This causes the lifter plate 10 to reach the back of the base 1B. A magnet 30 is mounted on the back of the base 1B so that it will be opposed to the extended portion 15 of the lifter plate 10. Therefore, when the lifter plate 10 reaches the back of the base 1B, the lifter plate 10 is settled while being attracted by the magnet 30.

When the lifter plate 10 is lifted to reach the back of the base 1B, the alignment pins 11 and 12 jutting out of the lifter plate 10 are fitted into the reference holes of an optical disk cartridge. Moreover, the spindle motor is chucked to the hub of an optical disk. The lifter plate 10 is held on the reference plane of the base 1B with the spindle motor chucked to the optical disk.

As mentioned above, in the conventional optical disk drive unit 1, the spindle motor 14 is mounted on the lifter plate 10. The spindle motor 14 is therefore lifted or lowered depending on whether an optical disk cartridge is inserted into or ejected from the optical disk drive unit 1. The spindle motor is mounted independently of the reading/writing mechanism. The FPC board 53 is therefore needed as a dedicated signal line linked to the spindle motor 14.

The spindle motor 14 is lifted or lowered as mentioned above. The conventional optical disk drive unit 1 has, as shown in FIG. 5, three slope adjustment screws 54 attached to the back of the carriage 47 that moves along the magnetic circuits 48. The three slope adjustment screws 54 are used to adjust the slope of the objective of the carriage 47. This means that an adjusted part is a movable part and likely to move during adjustment. The adjustment is therefore hard to achieve. Moreover, a structure needed for adjustment is included in the carriage 47. This leads to increase in the weight of the carriage 47.

Furthermore, the conventional optical disk drive unit 1 has the stationary optical assembly 7 provided separately from the drive base 1B and mounted on the back of the drive base 1B. The optical axis of the stationary optical assembly 7 must be aligned with that of the carriage 47. Thus, assembling efficiency is poor.

Furthermore, the conventional optical disk drive unit 1 has a temperature sensor 55 located near the stationary optical assembly 7. The temperature sensor 55 is not located near an optical disk. The temperature of a medium, that is an optical disk, must be calculated based on the temperature value provided by the temperature sensor 55. The medium temperature is therefore inaccurate. Consequently, the conditions for reading or writing must be set rather roughly.

In addition, the conventional optical disk drive unit 1 has, as shown in FIG. 5, a home position sensor 56 located independently. The home position sensor 56 detects the home position of the carriage 47 included in the movable optical assembly 45. The dedicated cable and connector are therefore necessary to transmit a detection signal output from the home position sensor 56 to the printed wiring board. This leads to high cost.

Compared with the conventional optical disk drive unit 1 having the foregoing components, an optical disk drive unit 100 in accordance with the present invention will be described below.

Figure 7:
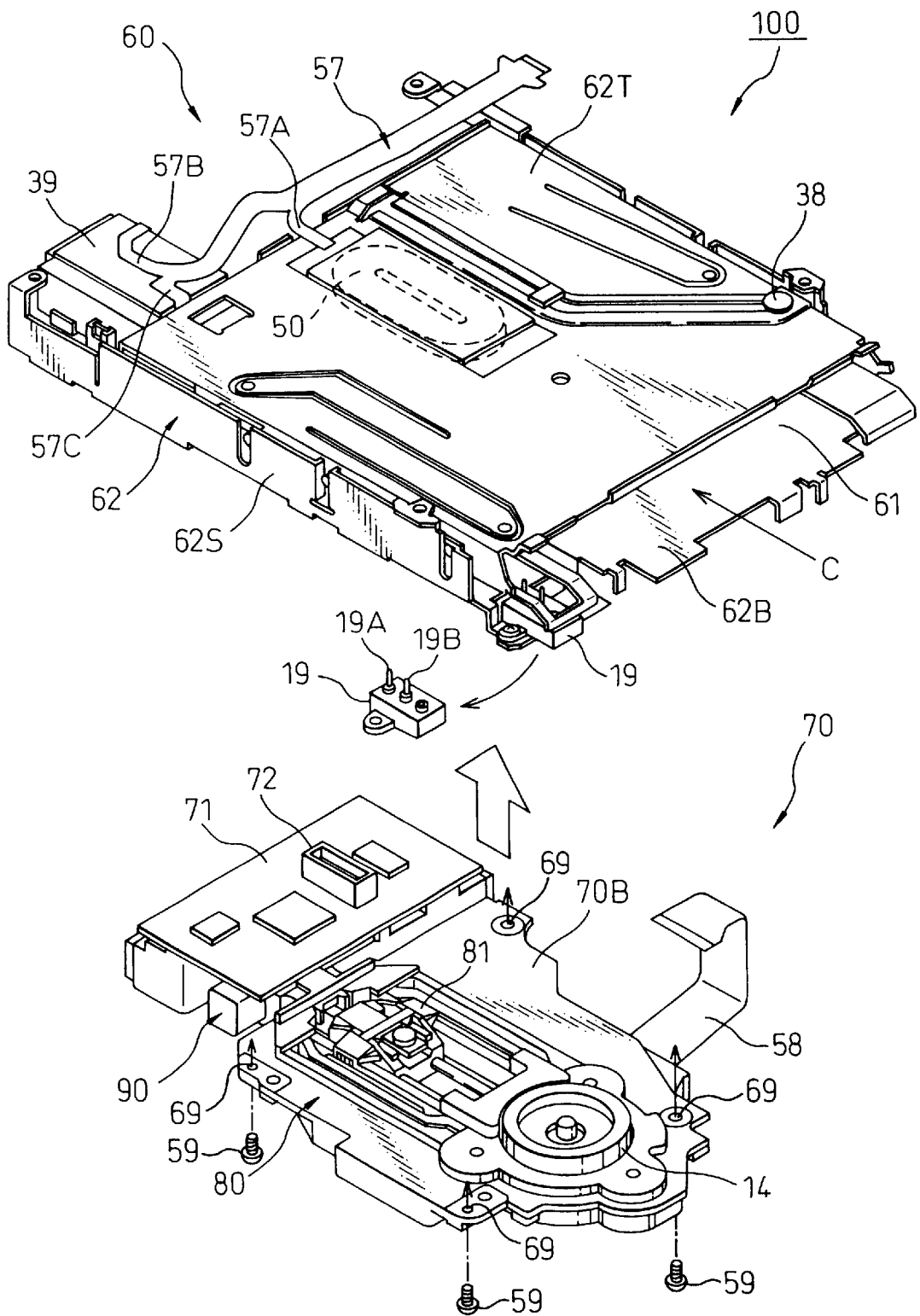
FIG. 7 is an exploded oblique view of an embodiment of an optical disk drive unit in accordance with the present invention.
Figure 8:
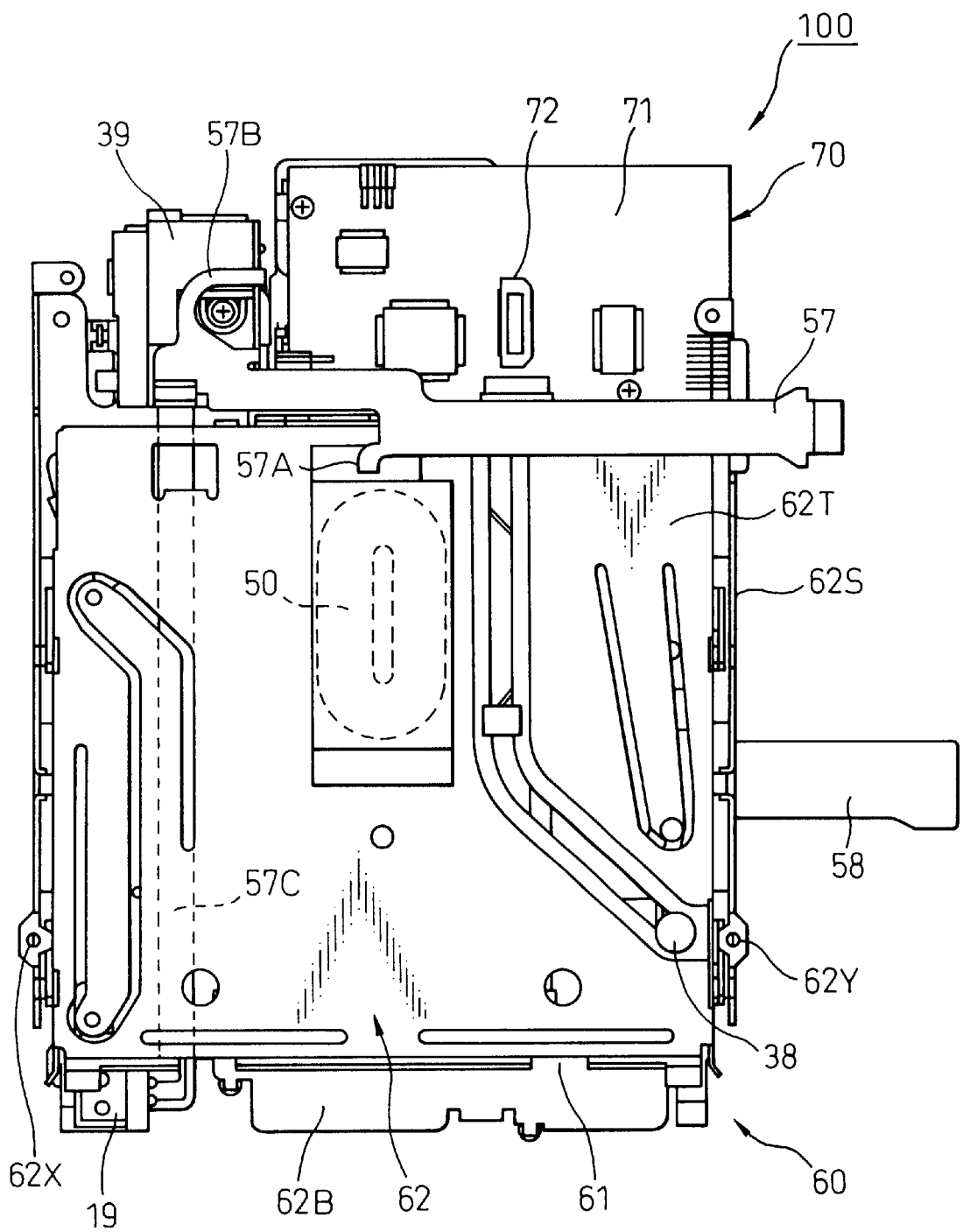
FIG. 8 is a plan view showing the optical disk drive unit, which is shown in FIG. 7, with a reading/writing mechanism attached to a load/ejection mechanism.

FIG. 7 is an exploded view of a major portion of the optical disk drive unit 100 in accordance with an embodiment of the present invention. For better understanding, the same reference numerals will be assigned to members identical to those employed in the conventional optical disk drive unit 1. New reference numerals will be assigned to members newly employed in accordance with the present invention. Moreover, FIG. 8 shows the optical disk drive unit 100 with a reading/writing mechanism 70 attached to the lower side of a load/ejection mechanism 60.

As described in conjunction with FIG. 2 to FIG. 6, the conventional optical disk drive unit 1 has the disk loading assembly 5, stationary optical assembly 7, and the lifter plate 10, which are provided separately, attached to the drive base 1B. The spindle motor 14 and cartridge identification switch 19 are mounted on the lifter plate 10. In contrast, the optical disk drive unit 100 in accordance with the present invention consists of the load/ejection mechanism 60 equivalent to the disk loading assembly 5 included in the conventional optical disk drive unit, and the reading/writing mechanism 70. The drive base 1B, stationary optical assembly 7, and spindle motor 14 included in the conventional optical disk drive unit are integrated into the reading/writing mechanism 70. The printed wiring board 3, insulation sheet 4, frame 6, top cover 8, and bottom cover 9 included in the conventional optical disk drive unit 1 shown in FIG. 2 are also included in the optical disk drive unit 100 in accordance with the present invention. The abilities and locations of these components are identical to those of the counterparts in the conventional optical disk drive unit 1, though the shapes thereof are different. These components are therefore not illustrated.

The load/ejection mechanism 60 is formed with a rectangular chassis 62 having a slot 61 through which the optical disk cartridge 2, shown in FIG. 1, is inserted in a direction of arrow C. The chassis 62 consists of a bottom plate 62B, two side plates 62S, and a top plate 62T. The cartridge identification sensor 19 for detecting the type of cartridge and recognizing whether a cartridge is write-protected is mounted on the bottom plate 62B near the slot 61. Moreover, the ejection motor 39 for ejecting an optical disk cartridge inserted into the chassis 62 is mounted on the bottom plate 62B at an end opposite to the slot 61.

The open/close arm 38 for opening the shutter of an optical disk cartridge inserted into the chassis 62, and the bias magnet assembly 50, are mounted on the top plate 62T. Moreover, a lifting mechanism for lifting or lowering the top plate 62T is sandwiched among the side plates 62S and top plate 62T. When an optical disk cartridge is fully inserted into the chassis 62, the top plate 62T causes the optical disk cartridge to rest on the bottom plate 62B owing to the lifting mechanism. The optical disk cartridge is then engaged with a spindle motor that will be described later. The lifting mechanism is already known and will therefore not be described herein.

The load/ejection mechanism 60 has one FPC board 57 for transferring signals to or from a printed wiring board that will be described later. The distal part of the FPC board 57 is split into three portions. A first FPC board 57A is linked to the bias magnet assembly. 50. A second FPC board 57B is linked to the ejection motor 39, and a third FPC board 57C is linked to the cartridge identification switch 19 as detailed in FIG. 8. The state of the cartridge identification switch 19 dismounted from the chassis 60 is shown separately in FIG. 7. According to the present invention, the cartridge identification switch 19 consists of two switches 19A and 19B. These two switches 19A and 19B are used to recognize whether an optical disk cartridge is write-protected.

The reading/writing mechanism 70 is attached to the lower surface of the bottom plate 62B of the load/ejection mechanism 60 with screws 59. The screws 59 are fitted into screw holes 69 bored in the base 70B. The spindle motor 14, a movable optical assembly 80, a stationary optical assembly 90, and a printed-circuit board 71 are mounted on a metallic base 70B. The printed-circuit board 71 has a connector 72 via which the printed-circuit board 71 is connected to a printed wiring board attached to the top of the load/ejection mechanism 60. An FPC board 58 transmits a signal to the spindle motor 14 and a signal to the movable optical assembly 80. The components of the reading/writing mechanism 70 will be described later.

Figure 9:
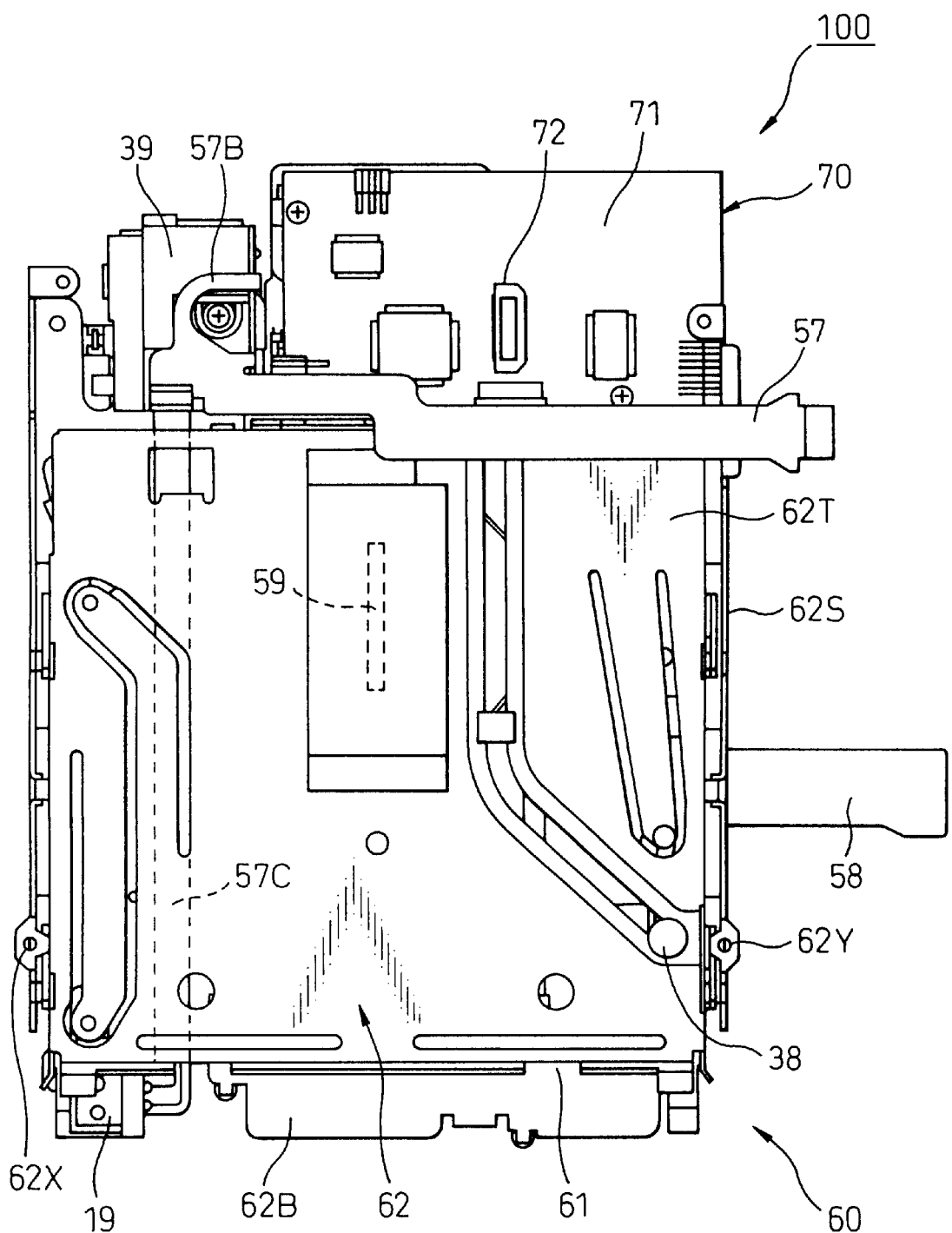
FIG. 9 is a plan view showing another example of load/ejection mechanisms employed in the optical disk drive unit in accordance with the present invention.

FIG. 9 is a plan view showing the same portion as that shown in FIG. 8. However, the portion shown in FIG. 9 is included in an embodiment other than the embodiment shown in FIG. 8. In the embodiment shown in FIG. 8, the bias magnet assembly 50 having an electromagnet is mounted on the top plate 62T of the load/ejection mechanism 60. The third FPC board 57A for supplying power to the electromagnet is branching out of the FPC board 57 and linked to the bias magnet assembly 50. In contrast, in the embodiment shown in FIG. 9, a permanent magnet 59 is mounted on the top plate 62T of the load/ejection mechanism 60 in place of the bias magnet assembly 50. This is only a difference from the embodiment shown in FIG. 8. In the embodiment shown in FIG. 9, the third FPC board 57A therefore does not branch out from the distal part of the FPC board 57.

In general, the optical disk drive unit writes or deletes data on or from an optical disk by changing a magnetic field. An electromagnet is therefore used as a bias magnet. This is because data is written or recorded on an optical disk after erased. A magnetic field of which a direction can be set to one direction is applied for erasure, and a magnetic field whose direction is set to an opposite direction is then applied for writing. In recent years, an optical disk formed using a medium enabling overwriting has made its debut. The optical disk is designed so that erasure of data is achieved during writing of data according to a light modulation technique. When data is recorded on the optical disk formed using the medium enabling overwriting, it is unnecessary to reverse a magnetic field. A permanent magnet producing a steady-state magnetic field can be employed. The embodiment shown in FIG. 9 can therefore be adapted exclusively to the optical disk drive unit 100 supporting only the medium enabling overwriting.

A driving mechanism for assisting in inserting a cartridge, which accommodates an optical disk, into a main unit, driving the optical disk, and writing or reading data on or from the optical disk is divided into the load/ejection mechanism 60 and reading/writing mechanism 70. Steps of assembling the components of the mechanisms can be determined mutually independently, whereby an assembly line can be simplified. Moreover, the reading/writing mechanism 70 that is a subassembly should merely be attached to the load/ejection mechanism 60 at a succeeding step. Parts adjusted at preceding steps at which the components of the mechanisms are assembled will not be impaired.

Figure 10:
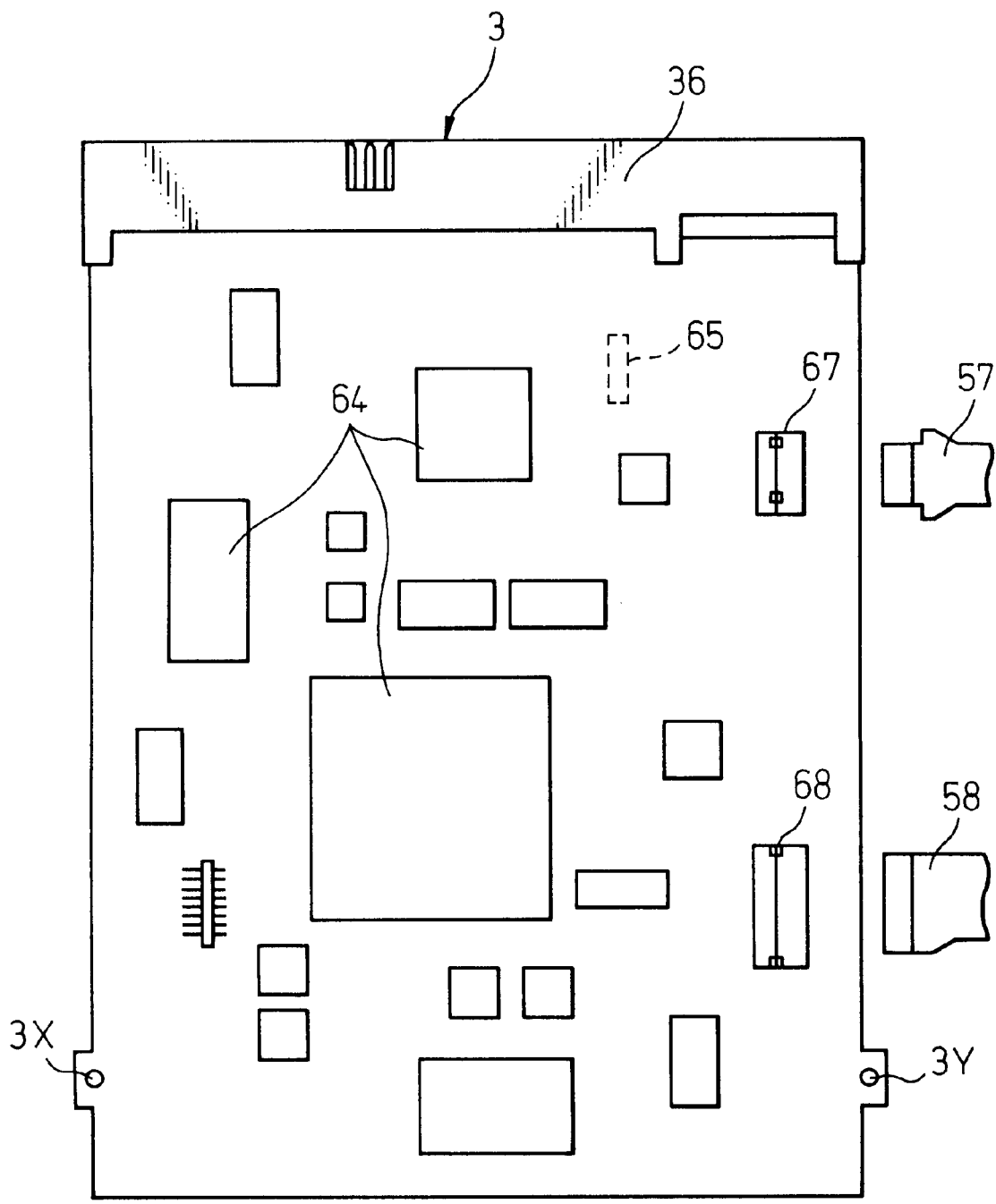
FIG. 10 is a plan view showing an example of printed wiring boards employed in the optical disk drive unit in accordance with the present invention.

FIG. 10 shows an example of printed wiring boards serving as the printed wiring board 3 to be attached to the assembly of the load/ejection mechanism 60 and reading/writing mechanism 70 shown in FIG. 8 or FIG. 9. The printed wiring board 3 is attached to the chassis 62 with a connector 65, which is mounted on the back of the printed wiring board 3, mated with the connector 72 shown in FIG. 8 or FIG. 9. Screw holes 3X and 3Y are bored in the printed wiring board 3 on both sides of the printed wiring board 3, and screw holes 62X and 62Y are bored in the side plates 62S of the chassis 62. The printed wiring board 3 is fixed to the chassis 62 by tightening screws, which are not shown, fitted into the mutually matched screw holes 3X and 3Y and screw holes 62X and 62Y. The connector 36 via which the printed wiring board 3 is connected to an external apparatus is located on one edge of the printed wiring board 3. Moreover, various kinds of integrated circuits 64 for giving control and connectors 67 and 68 are mounted on the printed wiring board 3. The FPC boards 57 and 58 described in conjunction with FIG. 8 and FIG. 9 are coupled to the connectors 67 and 68.

Figure 11A:
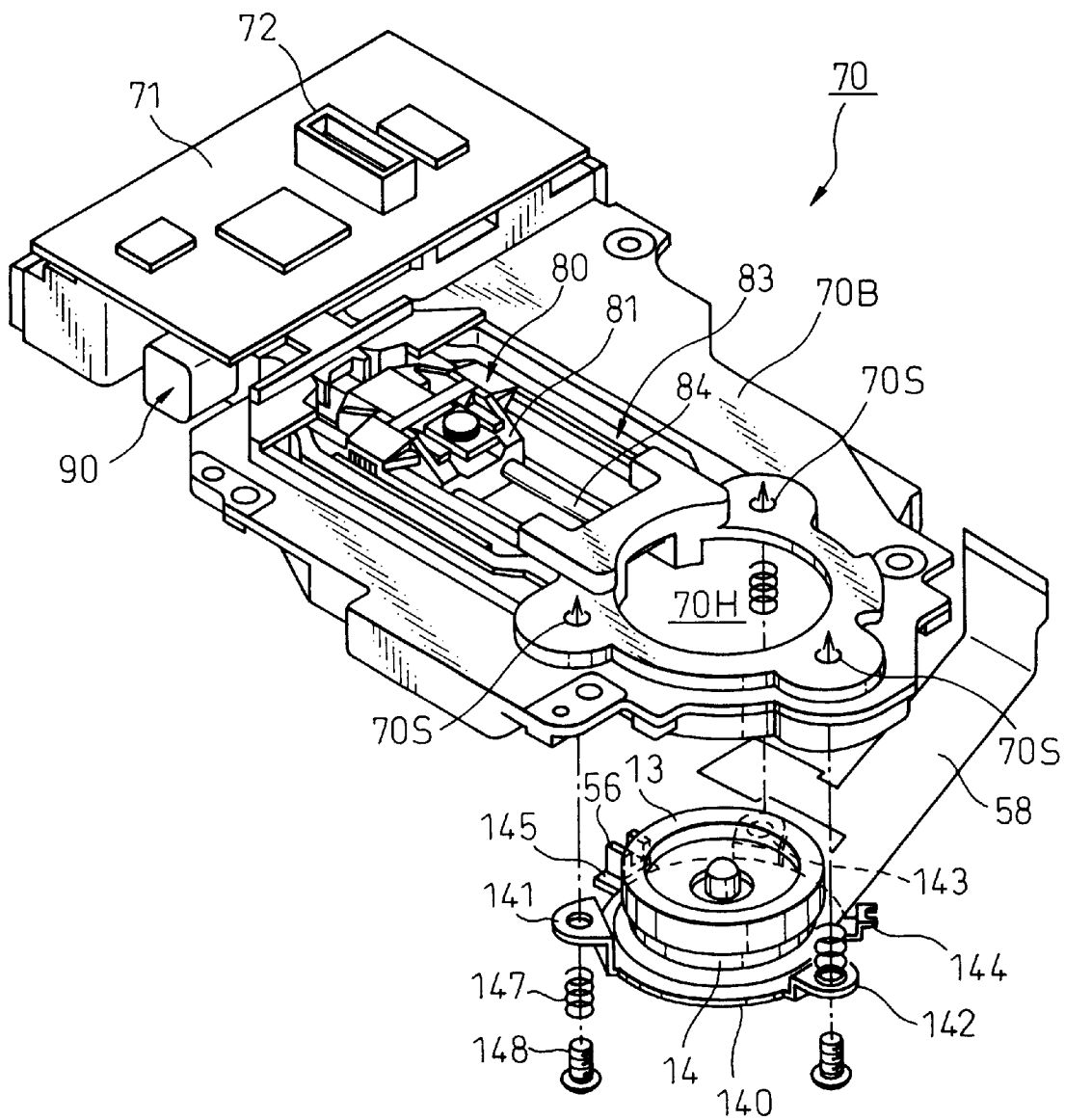
FIG. 11A is an exploded oblique view showing a spindle motor in an example of reading/writing mechanism employed in the optical disk drive unit in accordance with the present invention.
Figure 11B:
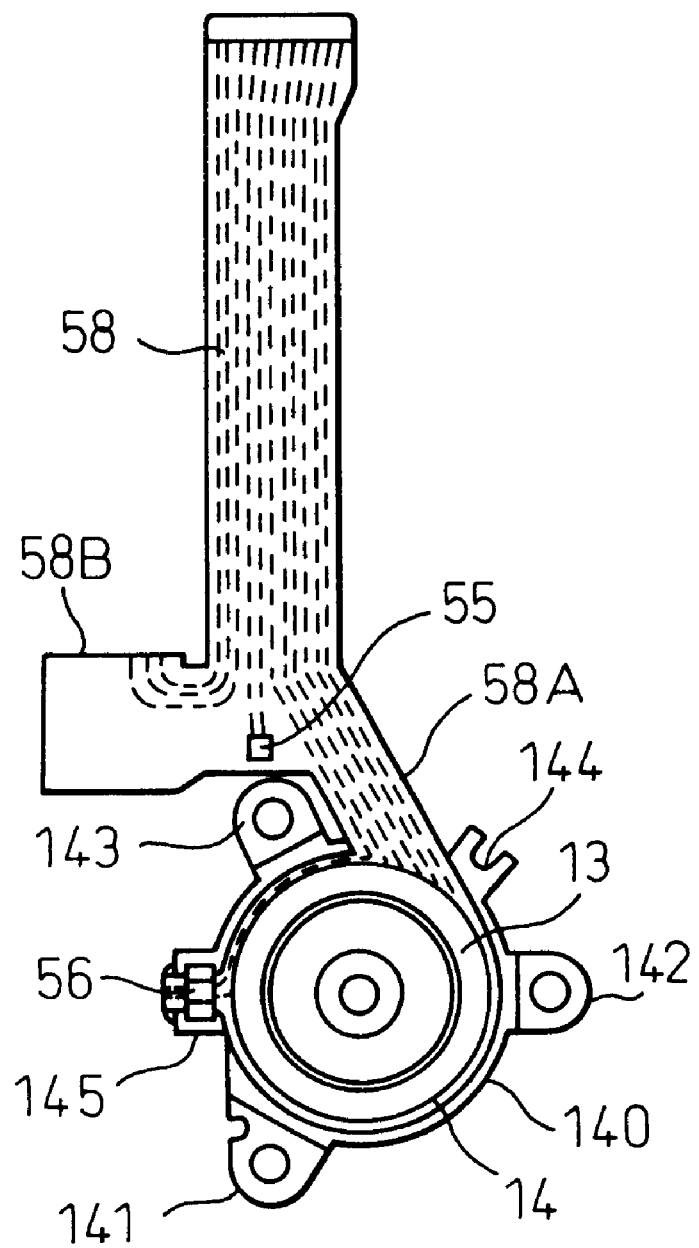
FIG. 11B is a plan view showing the spindle motor and a flexible printed-circuit board that are shown in FIG. 11A.
Figure 12A:
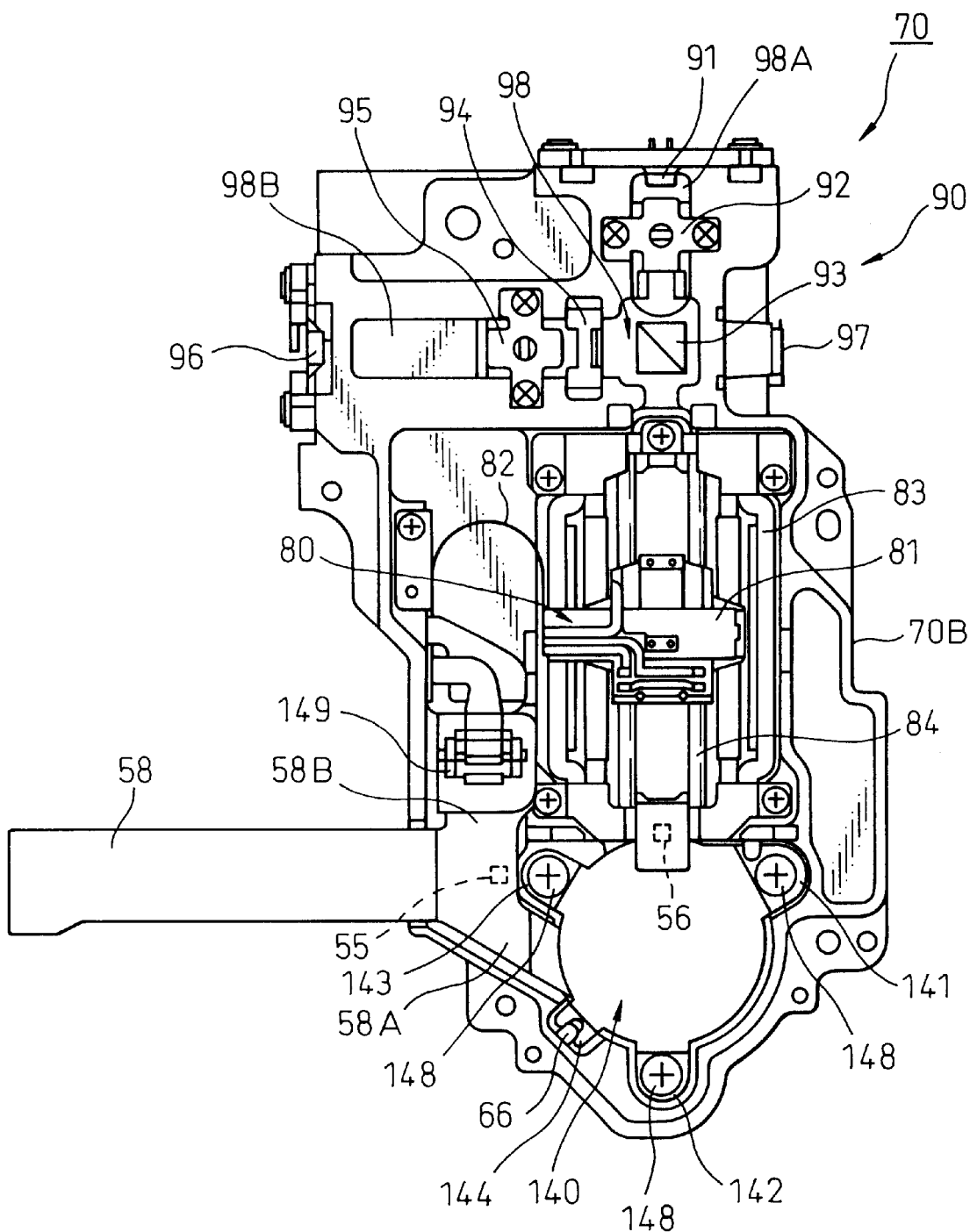
FIG. 12A is a bottom view showing an example of reading/writing mechanisms employed in the optical disk drive unit in accordance with the present invention.
Figure 13:
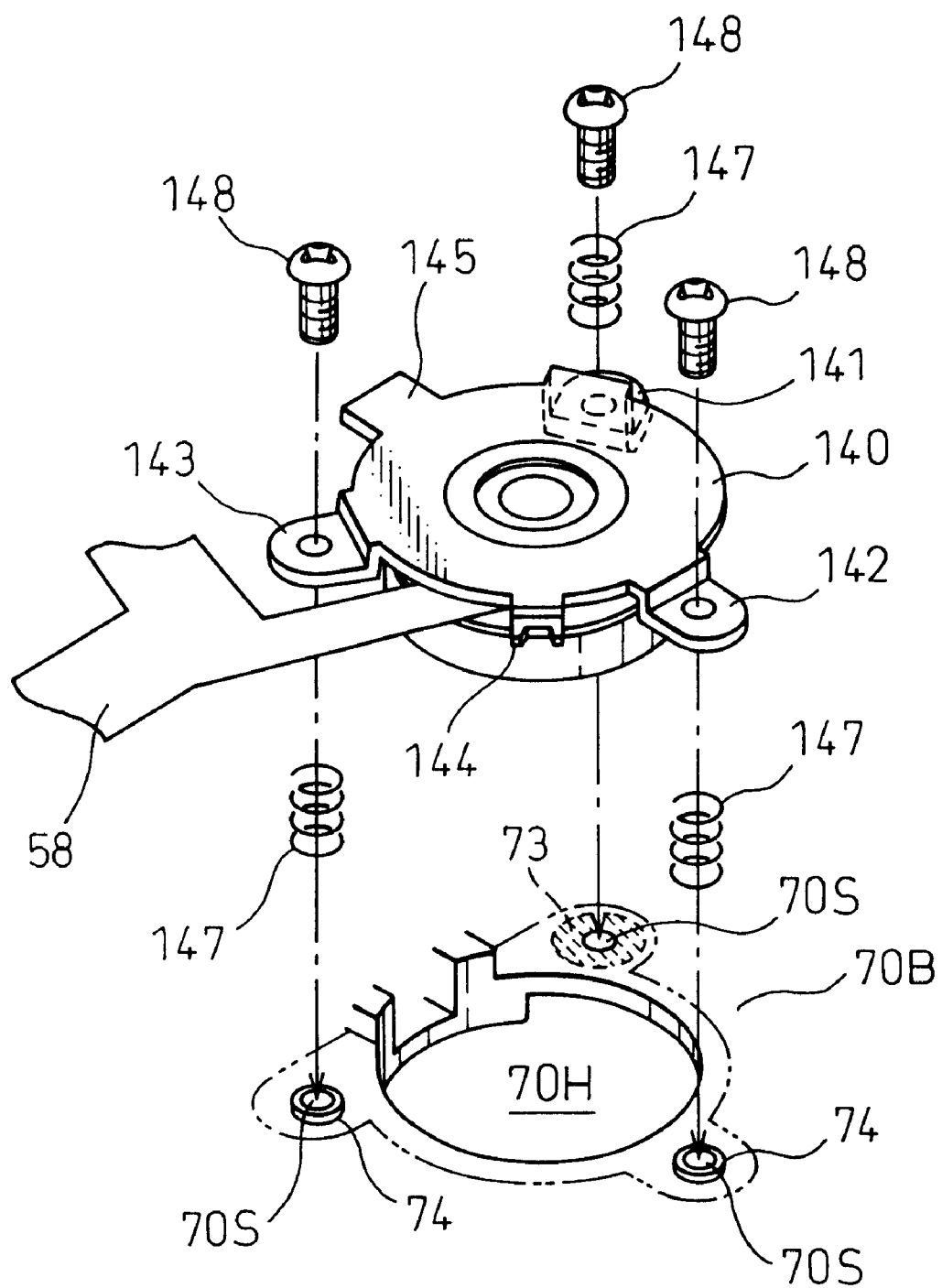
FIG. 13 is an exploded oblique view for explaining mounting of the spindle motor on the reading/writing mechanism in accordance with the present invention.
Figure 14:
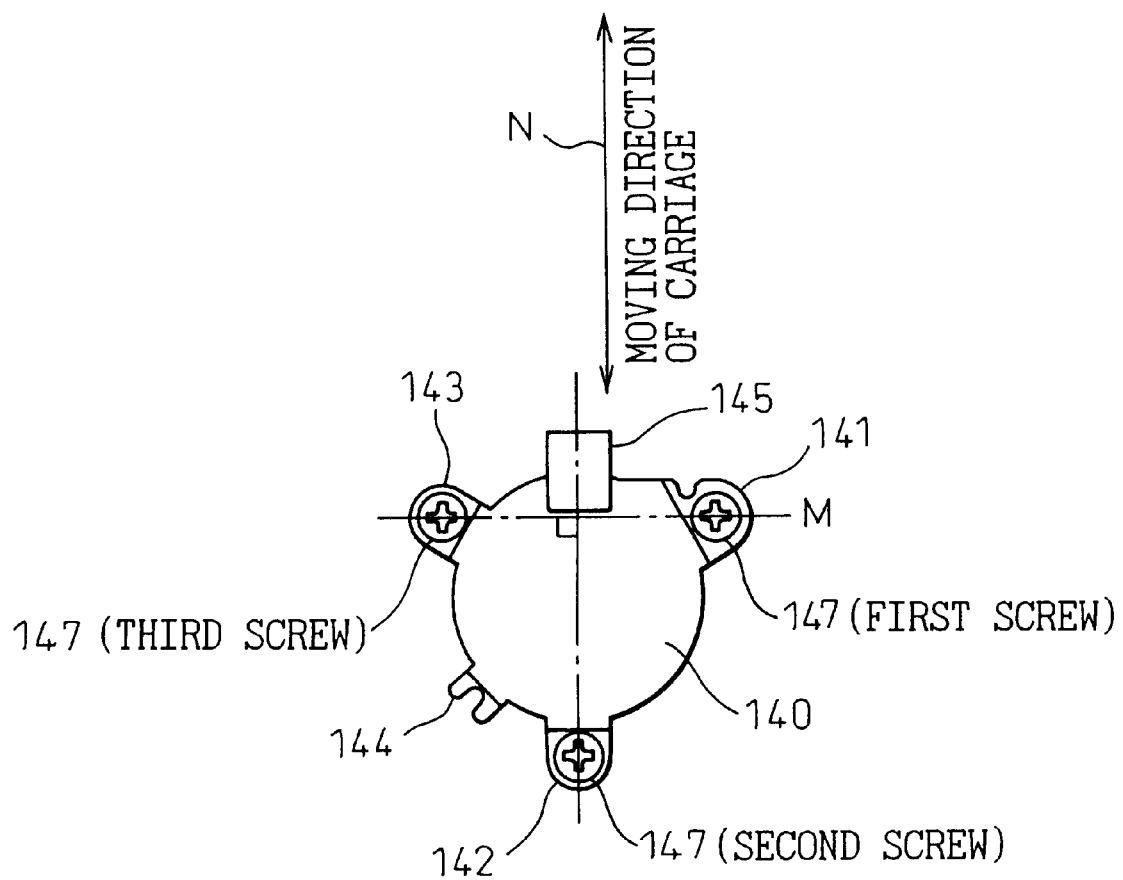
FIG. 14 is a partial bottom view for explaining positioning of the spindle motor in the reading/writing mechanism in accordance with the present invention.

FIG. 11A and FIG. 11B details the reading/writing mechanism 70 described in conjunction with FIG. 7. FIG. 11A shows how to mount the spindle motor 14 on the base 70B. FIG. 1B is a plan view showing solely the spindle motor 14. FIG. 12A shows the bottom of the reading/writing mechanism 70. FIG. 12B shows the bottom of the reading/writing mechanism 70 covered with a press-made metal cover 110. The metal cover 110 is comprised of a base plate 115 surrounded by a side wall 111 and three flanges each having a screw hole 112. The height of the side wall 111 is uniform. The metal cover 110 is fixed on the base 70B with screws 113 as an electromagnetic shield. FIG. 13 is a diagram for explaining how to mount the spindle motor 14 on the base 70B of the reading/writing mechanism 70.

As mentioned previously, the reading/writing mechanism 70 has the metallic base 70B. The spindle motor 14, movable optical assembly 80, stationary optical assembly 90, and printed-circuit board 71 are mounted on the base 70B. The spindle motor 14 is fixed to a seating 140. The spindle motor 14 is crowned with the turntable 13 to be engaged with the hub of an optical disk.

As shown in FIG. 11A, FIG. 11B, and FIG. 13, the seating 140 is shaped like a disk. Three parts of the circumference of the seating are extended and formed as legs 141, 142, and 143 with which the seating 140 is fixed to the base 70B. A positioning bracket 144 is formed between the legs 142 and 143, and an extended portion 145 on which the home position sensor 56 is placed that will be described later is formed between the legs 141 and 143. A through hole 70H into which the spindle motor 14 is fitted is bored in the base 70B. For mounting the seating 140 on the base 70B, springs 147 that have the same size and screws 148 that have the same size are used.

Among the three legs 141, 142, and 143, two legs 142 and 143 are short in height from the seating 140, but the leg 141 is long in height therefrom. An area surrounding a screw hole 70S bored in the base 70B and associated with the leg 141 is after-machined in order to form a reference plane 73 (hatched area in FIG. 13) that is excellent in profile irregularity. An annular jut 74 whose outer diameter is smaller than the inner diameter of the spring 147 is fixed onto the perimeters of the screw holes 70S in the base 70B associated with the legs 142 and 143.

Figure 15A:
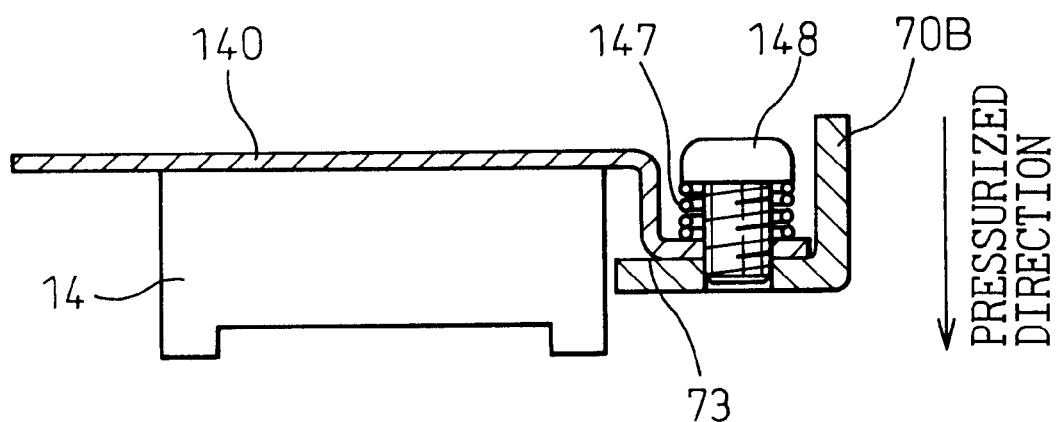
FIG. 15A is a cutaway side view showing the structure of a first screw stopper of the spindle motor in accordance with the present invention.

For mounting the seating 140, to which the spindle motor 14 is fixed, on the base 70B, the springs 147 are engaged with the annular juts 74, and the legs 142 and 143 are overlay the springs 147. The spindle motor 14 is then fitted into the through hole 70H, and the leg 141 is placed on the reference plane 73 of the base 70B. The screw 148 carrying the spring 147 is inserted into the leg 141, and fitted into the screw hole 70S in the reference plane 73. At this time, the screw 148 will not be tightened to such an extent that the spring 147 is fully compressed. Pressurizing force exerted by the spring 147 is used to bring the leg 141 into close contact with the reference plane 73. This state is shown in FIG. 15A. The reference plane 73 with which the leg 141 comes into close contact serves as a reference plane determining the height of the spindle motor 14.

Figure 15B:
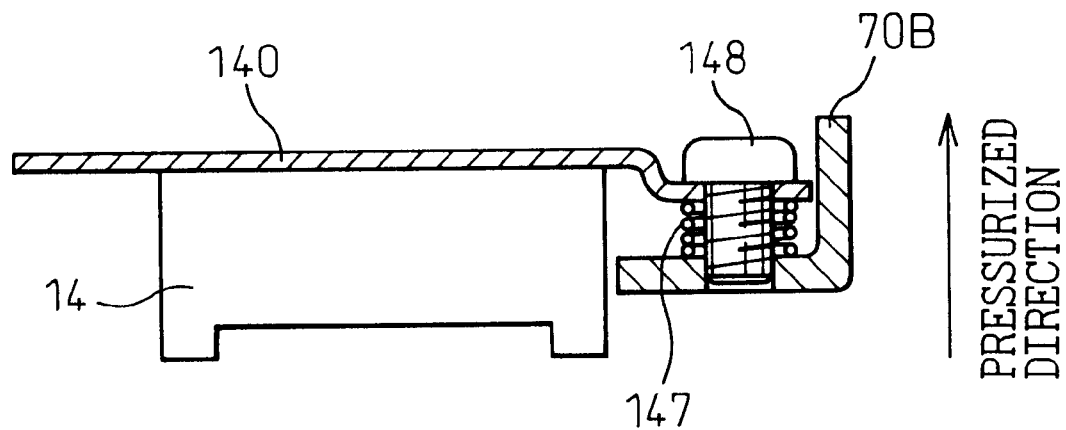
FIG. 15B is a cutaway side view showing the structure of a second screw stopper of the spindle motor in accordance with the present invention.

Thereafter, the screws 148 are inserted into the remaining legs 142 and 143 and passed through the springs 147 sandwiched between the legs 142 and 143 and the base 1B. The screws 148 are then fitted into the screw holes 70S in the base 70B. This state is shown in FIG. 15B. At this time, the positioning bracket 144 of the seating 140 is, as shown in FIG. 12A, engaged with a positioning projection 66 formed on the base 70B. Consequently, the legs 142 and 143 are matched with the screw holes 70S in the base 70B. The springs 147 pressurize the legs 142 and 143 in a direction in which the legs 142 and 143 recede from the base 70B.

The spindle motor 14 is mounted on the base 70B via the seating 140 as mentioned above. For adjusting the slope of the spindle motor 14, first, the screw 147 (first screw) inserted into the leg 141 is tightened in order to pressurize the leg 141. The spring 147 of the leg 141 serves as a rotation support screw. Thereafter, the screw 147 (second screw) inserted into the leg 142 and the screw 147 (third screw) inserted into the leg 143 are tightened. A line M linking the first and third screws is orthogonal to moving directions N in which the carriage 81 moves. When the second screw is turned, a direction in which the spindle motor is tilted, in order to adjust the slope thereof, becomes coincident with a radial direction of a medium that is an optical disk at a position at which the lens mounted on the carriage converges light.

Figure 16A:
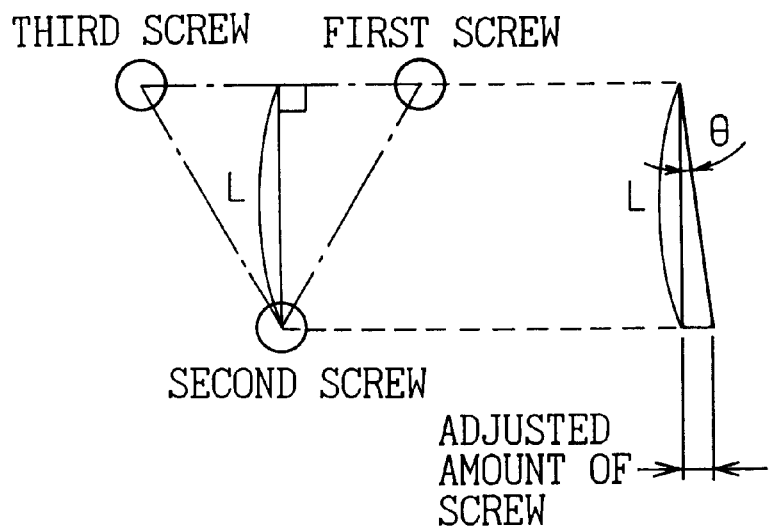
FIG. 16A is explanatory diagrams concerning adjustment of a second screw during mounting of the spindle motor on the reading/writing mechanism.
Figure 16B:
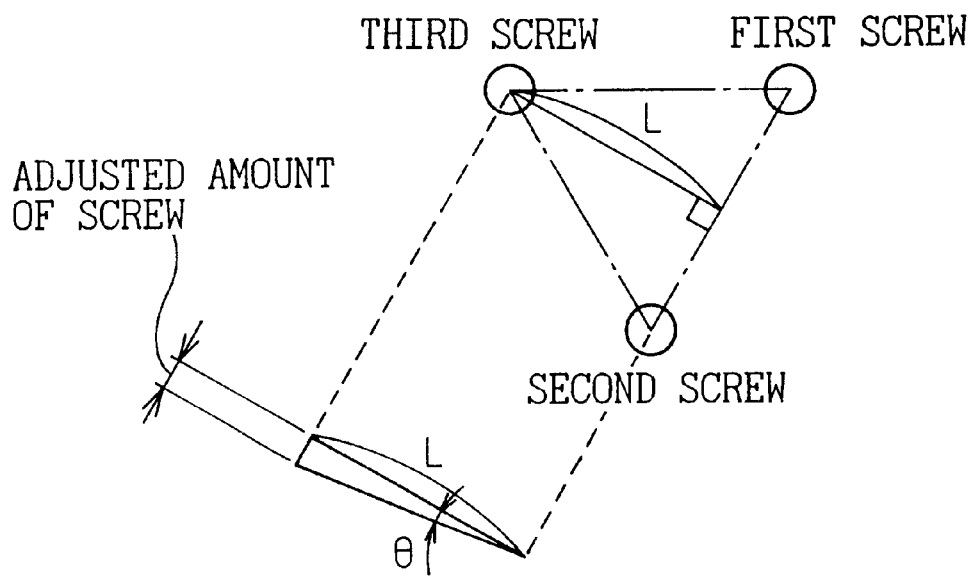
FIG. 16B is explanatory diagrams concerning adjustment of a third screw during mounting of the spindle motor on the reading/writing mechanism.

FIG. 16A is intended to explain how to adjust the second screw. FIG. 16B is intended to explain how to adjust the third screw. Assume that the second and third screws are regarded as vertices of an isosceles triangle having the first screw as one vertex. The length of a perpendicular extending from the second screw at right angles to a side linking the first screw and third screw is, as shown in FIG. 16A, L. The length of a perpendicular extending from the third screw at right angles to a side linking the first screw and second screw is, as shown in FIG. 16B, also L. When an adjusted screw is the second screw, a change in the slope of the spindle motor relative to a magnitude of tightening a screw is regarded as a vertical angle θ of a triangle shown on the right-hand side of FIG. 16A, and given by the following formula:

$$\theta = \tan^{-1}(\text{magnitude of tightening a screw}/L) \ldots (1)$$

When the adjusted screw is the third screw, the change in the slope relative to the magnitude of tightening a screw is regarded as a vertical angle θ of a triangle shown on the left-hand side of FIG. 16B, and given by the formula (1). Consequently, the positions of the second and third screws are determined so that these screws will serve as vertices of an isosceles triangle having the first screw as a vertex. Eventually, the lengths L become equal to each other, and the sensitivity of the spindle motor relative to adjustment becomes stable irrespective of whether the adjustment is performed at either of the two adjustment points (second screw and third screw).

Owing to the foregoing structure, the parts constituting the structure for adjusting the slope of the spindle motor 14 can be simplified. The accuracy in detecting a direction that has a significant meaning in adjustment of the slope can be improved. In this case, even when the positions of the second and third screws are determined so that these screws will serve as vertices of an equilateral triangle having the first screw as a vertex, the same advantages can be exerted.

Next, the structure of the FPC board 58 linked to the spindle motor 14 will be described. The distal part of the FPC board 58 is, as shown in FIG. 11B, bifurcated into an FPC board 58A and an FPC board 58B. The temperature sensor 55 is located near the spindle motor 14 at the bifurcation of the FPC board into the FPC board 58A and FPC board 58B. The temperature sensor 55 is connected to a pattern of circuits drawn on the FPC board 58. Moreover, the FPC board 58A is linked to the spindle motor 14, and then to the home position sensor 56. A connector 149 is, as shown in FIG. 12A, attached to the back of the distal part of the other FPC board 58B. An FPC board 82 for driving the carriage 81 of the movable optical assembly 80 is coupled to the connector 149. The home position sensor 56 is formed with, for example, a photo-interrupter (interceptive optical sensor).

As mentioned above, in this embodiment, the FPC board 58B is connected to the FPC board 82 for driving the carriage 81 of the movable assembly 80 included in the reading/writing mechanism 70. The FPC board 58A is linked to the home position sensor 56 and spindle motor 14 respectively. The FPC board 58A and FPC board 58B are integrated into the FPC board 58, and coupled to the connector 68 mounted on the printed wiring board 3 shown in FIG. 10. The temperature sensor 55 mounted on the FPC board 58 is used to detect the internal temperature of the drive unit near the spindle motor 14. The home position sensor 56 is used to detect the home position of the carriage 81 included in the movable optical assembly 80.

In this embodiment, the home position sensor 56 comes below an optical disk inside the reading/writing mechanism 70. Since an optical disk is focused with the carriage 81 positioned at the home position, the home position should preferably be detected below the optical disk inside the reading/writing mechanism 70. This is because deflection of light caused by the surface of the optical disk is limited below the optical disk inside the reading/writing mechanism 70.

Consequently, the temperature sensor 55 and the pattern of circuits for driving the home position sensor 56 and spindle motor 14 can be linked to the printed wiring board 3 by the same FPC board 58. This leads to a decrease in the number of parts and a saving of space. Furthermore, only one electrical interface is needed between the reading/writing mechanism 70 and printed wiring board 3. Further decrease in the number of parts can be realized. Consequently, assembling efficiency improves.

Figure 17A:
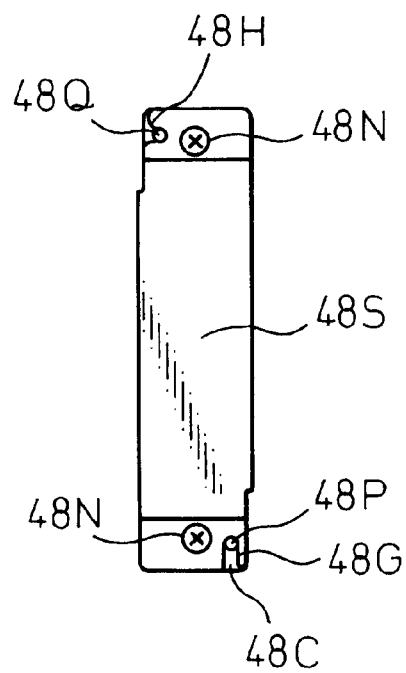
FIG. 17A and FIG. 17B are a front view and side view showing a conventional magnetic circuit.
Figure 17B:
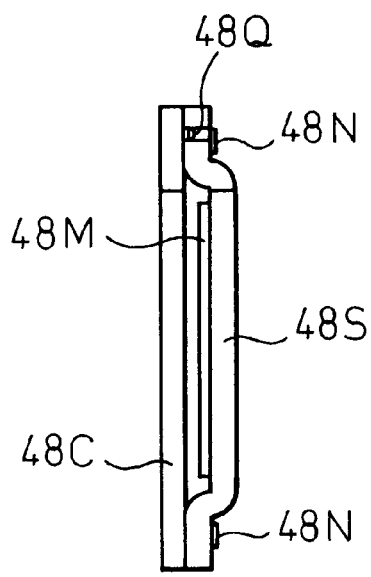

The magnetic circuits 48 in the conventional optical disk drive unit 1 described in conjunction with FIG. 5 are each, as shown in FIG. 17A and FIG. 17B, composed of a center yoke 48C and a side yoke 48S having a permanent magnet 48M attached thereto. For aligning the center yoke 48C and side yoke 48S with each other, two alignment pins 48P and 48Q jut out on substantially diagonal positions near corners of the center yoke 48C. Notches 48G and 48H are formed at coincident positions in the side yoke 48S. When the center yoke 48C and side yoke 48S are aligned with each other, the notch 48G of the side yoke 48S is engaged with the pin 48P of the center yoke 48C. The side yoke 48S is turned with the pin 48P as a center, whereby the other notch 48H of the side yoke 48S is engaged with the other pin 48Q. Thereafter, the center yoke and side yoke are secured using screws 48N.

The outer dimensions of the conventional magnetic circuit 48 are so large as to provide a sufficient area for the junction between the center yoke 48C and side yoke 48S.

Figure 17C:
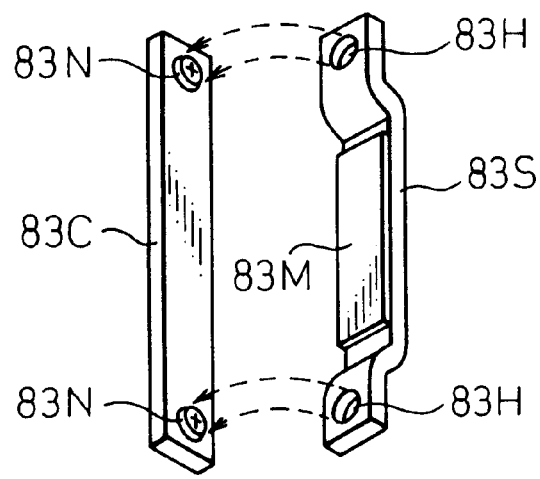
FIG. 17C and FIG. 17D are an oblique view showing assembling of components of a magnetic circuit in accordance with an embodiment of the present invention and a side view showing the magnetic circuit.
Figure 17D:
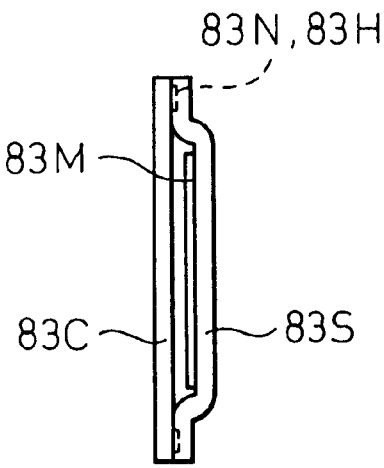

In contrast, in this embodiment of the present invention, as shown in FIG. 17C and FIG. 17D, both ends of a center yoke 83C of each of magnetic circuits 83 shown in FIG. 11 and FIG. 12A are fixed directly to the base 70B using screws 83N. The heads of the screws N jut out of the center yoke 83C. A side yoke 83S having a permanent magnet 83M attached thereto has concave parts 83H formed in planes that join the center yoke 83C. The heads of the screws 83N are fitted into the concave parts 83H.

As mentioned above, the heads of the screws 83N with which the center yoke 83C is fixed to the base 70B are used to position the side yoke 83S. An area at which the center yoke 83C and side yoke 83S meet can be made large without the necessity of increasing the outer dimensions of the magnetic circuit 83. Moreover, saturation in the magnetic circuit 83 can be prevented.

Figure 18A:
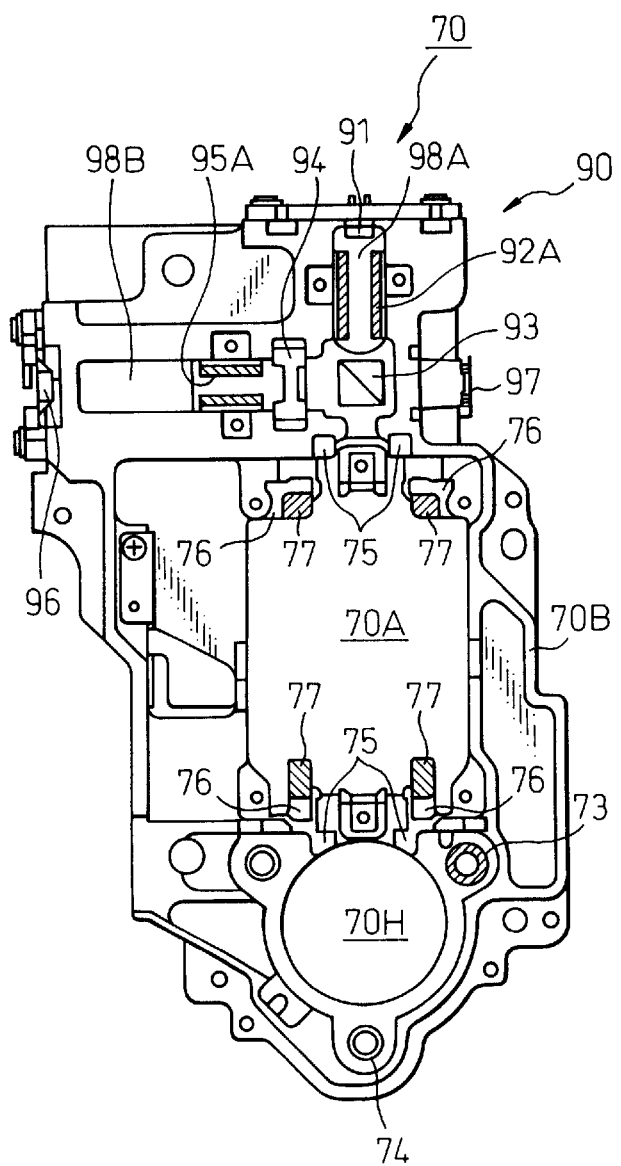
FIG. 18A is a plan view showing the structure of an example of bases for an optical data recording and reproducing apparatus in accordance with the present invention.

FIG. 18A shows the structure of the base 70B in accordance with the present invention and how to mount the movable optical assembly 80 on the base 70B. This embodiment adopts another method of joining the components of each of the magnetic circuits 83 included in the movable optical assembly 80. In addition to the through hole 70H into which the spindle motor 14 is fitted, a large and substantially rectangular stowage hole 70A, that accepts the movable optical assembly 80 shown in FIG. 18C, is bored in the base 70B.

Four rail holding recesses 75 and four stowage portions 76 are formed on the opposed sides of the stowage hole 70A. The rail holding recesses 75 accept both the ends of two slide rails 84 along which the carriage 80 of the movable optical assembly 80 slides. The stowage portions 76 accept both the ends of the center yokes 83c and side yokes 83S constituting the magnetic circuits 83. The four stowage portions 76 have reference planes 77 that are formed to be excellent in profile irregularity by after-machining the base 70B.

Figure 18B:
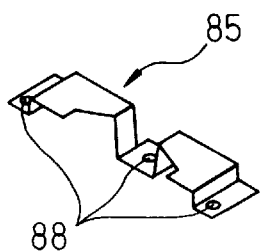
FIG. 18B is an oblique view showing a first presser spring for a carriage.
Figure 18C:
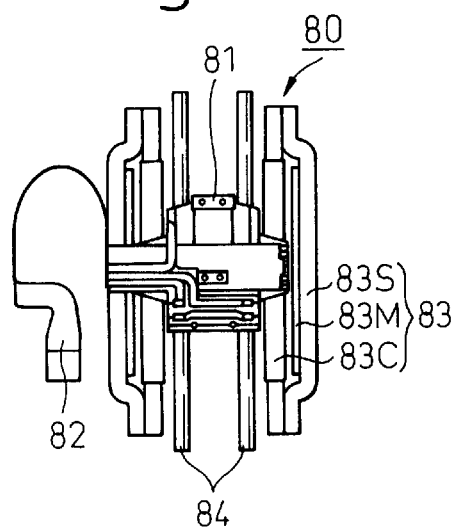
FIG. 18C is a plan view of the carriage to be mounted on the base shown in FIG. 18A.
Figure 20:
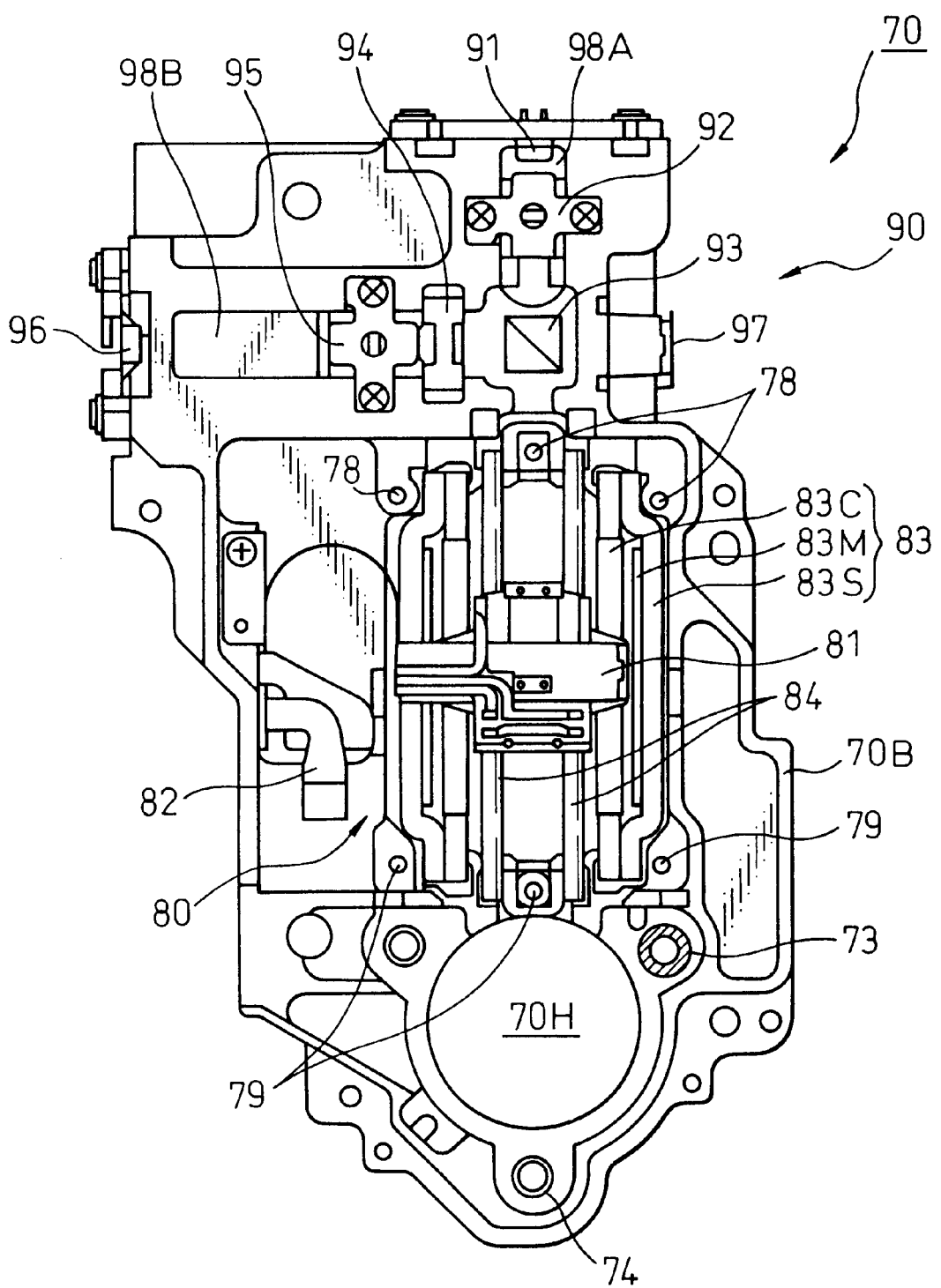
FIG. 20 is a plan view showing a base shown in FIG. 19A with a carriage mounted on the base.

The movable optical assembly 80 has, as shown in FIG. 18C, the two slide rails 84 and two center yokes 83C passed through the carriage 81 in advance. The side yokes 83S are then attached to the center yokes 83C. Thereafter, the both ends of the two slide rails 84 of the movable optical assembly 80 and the both ends of the joined center yokes 83C and side yokes 83S thereof are fitted into the four rail holding recesses 75 and four stowage portions 76 formed in the base 70B. The movable optical assembly 80 is thus mounted on the base 70B. This state is shown in FIG. 20. The magnetic circuits 83 are placed on the reference planes 77 that are excellent in profile irregularity. Consequently, the magnetic circuits 83 are mounted on the base 70B precisely.

Figure 18D:
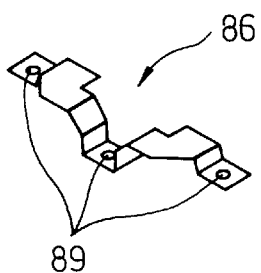
FIG. 18D is an oblique view showing a second presser spring for the carriage.

Thereafter, screws that are not shown are passed through three holes 88 bored in a fixing bracket 85 shown in FIG. 18B. The screws are fitted into screw holes 78 bored in the base 70B and then tightened. Screws that are not shown are passed through three holes 89 of another fixing bracket 86 shown in FIG. 18D. The screws are fitted into screw holes 79 bored in the base 70B and then tightened. Consequently, the movable optical assembly 80 is mounted on the base 70B. The state shown in FIG. 12 is thus attained.

As shown in FIG. 18A to FIG. 18D, according to this embodiment, the movable optical assembly 80 can be mounted precisely on the base 70B by performing simple work.

On the other hand, the stationary optical assembly 90 included in the optical disk drive unit 100 in accordance with the present invention is, as shown in FIG. 7, FIG. 11A, and FIG. 11B, located adjacently to the movable optical assembly 80 on the base 70B. The stationary optical assembly 90 consists of, as shown in FIG. 12A, a laser diode unit 91, a collimator lens 92, a beam splitter 93, a Wollaston prism 94, a condenser lens 95, a sensor 96, and a light level monitor unit 97. The light level monitor unit 97 monitors an amount of light emanating from the laser diode. The stationary optical assembly 90 is located around a groove 98 by denting, in the form of letter L, a portion of the base 70B of the reading/writing mechanism 70 adjacent to a portion thereof on which the movable optical assembly 80 is mounted.

The L-shaped groove 98 consists of a first groove 98A extending in the moving directions in which the carriage 81 moves and a second groove 98B extending in a direction orthogonal to the first groove 98A. The beam splitter 93 is located at an intersection between the first groove 98A and second groove 98B. The laser diode unit 91 is comprised of a base plate 91B and a laser beam emitting window 91A. The laser unit 91 is mounted on an outer wall of the first groove 98A with its laser beam emitting window 91A inserting into an opening 91A provided on the outer wall of the first groove 98A. The laser beam emitting window 91A and collimator lens 92 are located in the first groove 98A. The Wollaston prism 94 and condenser lens 95 are mounted in the second groove 98B. The Wollaston prism 94 is inserted into vertical grooves 94A provided on the side walls of the second groove 98B. A sensor 96 is mounted on an outer wall of the second groove 98B. Laser light emanating from the laser diode unit 91 passes through the collimator lens 92, and is then split by the beam splitter 93. One ray propagates straight and falls on the carriage 81 of the movable optical assembly 80 after passing through an opening 90A. The other ray is refracted 90° and incident on the light level monitor unit 97 for monitoring an. amount of light emanating from the laser diode after passing through an opening 97A.

Laser light reflected from an optical disk and emitted from the carriage 81 is refracted 90° by the beam splitter 93 and incident on the Wollaston prism 94. The laser light is split into nine rays and converged by the condenser lens 95, and then falls on the sensor 96 through an opening 96A. The sensor 96 consists of nine sensors and detects the focused state of a laser beam, the state of tracking, and read data in the light reflected from the optical disk.

In general, the base 70B of the reading/writing mechanism 70 is die-cast. The precision in the dimensions of the base 70B is low as long as the base is die-cast. According to the present invention, as the reference plane 73 (see FIG. 13) and the reference plane 77 (see FIG. 18A), a mount portion 92A and a mount portion 95A (hatched in FIG. 19A) are formed to have planes whose dimensions are precise by post-machining the base 70B. The mount portion 92A is a portion of the first groove 98A in which the collimator lens 92 is mounted, and the mount portion 95A is a portion of the second groove 98B in which the condenser lens 95 is mounted. The collimator lens 92 and condenser lens 95 are brought into contact with the planes whose dimensions are precise. The reference planes of the mount portion 92A in which the collimator lens 92 is mounted and the reference planes of the mount portion 95A in which the condenser lens 95 is mounted are shown hatched in FIG. 18A, too.

Figure 19A:
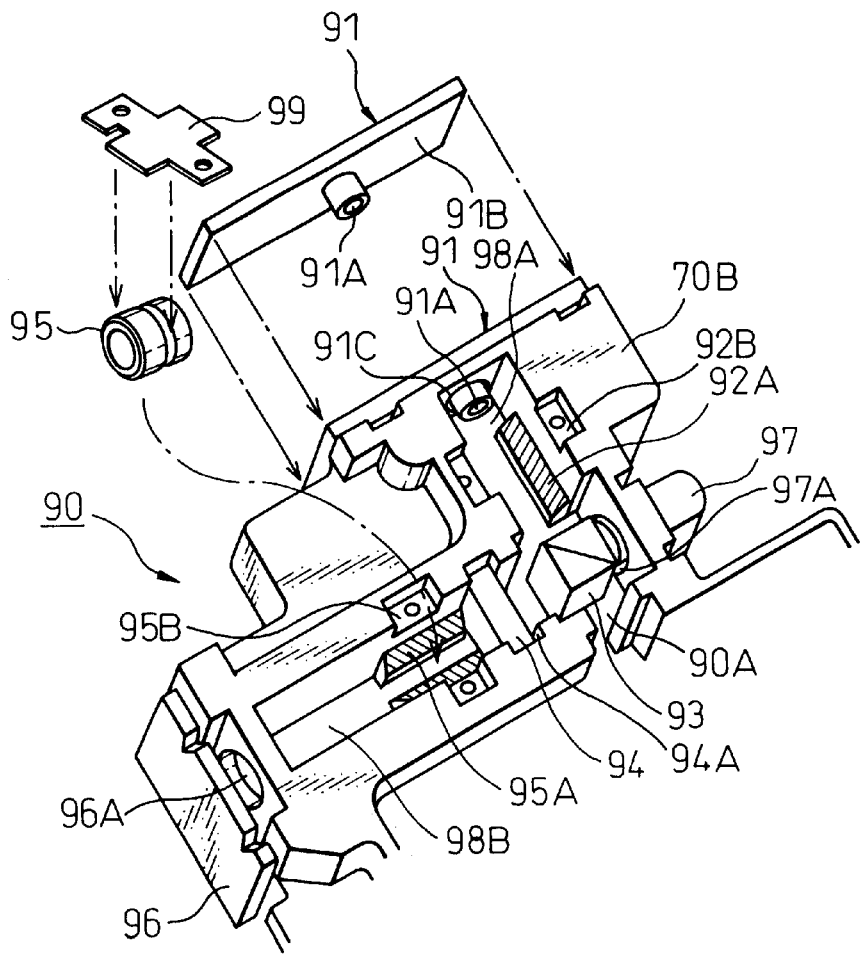
FIG. 19A is a partly exploded oblique view showing the structure of a stationary optical assembly included in a reading/writing mechanism in accordance with the present invention.
Figure 19B:
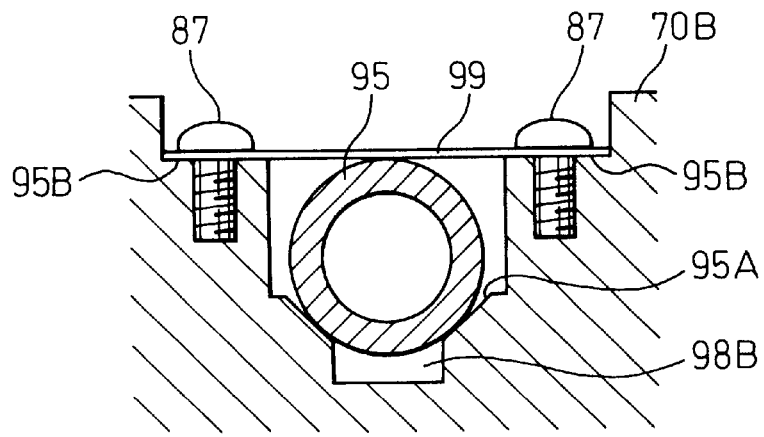
FIG. 19B is a partial sectional view of a major portion of the structure shown in FIG. 19A.

For example, the condenser lens 95 is, as shown in FIG. 19A and FIG. 19B, mounted in the mount portion 95A having the planes whose dimensions are precise, and then pressed by a mounting plate 99 screwed to a screw hole on the ditch 95B provided across the second groove 98B using screws 89. The condenser lens 95 is thus locked on the base 70B highly precisely. The collimater lens 92 is similarly locked on the base 70B highly precisely as the condenser lens 95 by the mounting plate 99 screwed to a screw hole on the ditch 92B provided across the first groove 98A.

The reason why the stationary optical assembly 90 is assembled in the L-shaped groove 98 is that the rigidity of the L-shaped groove is higher than the square-shaped groove, and the vibration generated by the carriage and the spindle motor is less affected to the stationary optical assembly 90. Further, the positioning of the optical members is easy by this structure.

Figure 21A:
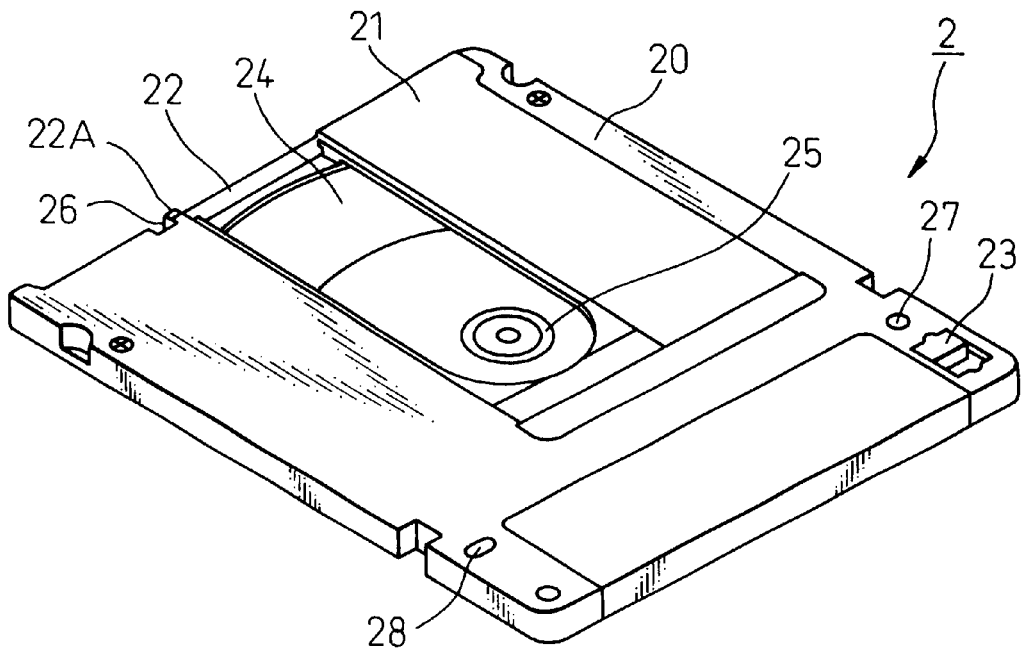
FIG. 21A is an oblique view showing the structure of an optical disk cartridge.

The optical disk cartridge 2 to be inserted into the optical disk drive unit 100 has the structure shown in FIG. 21A. Illustrated is the back of the optical disk cartridge 2. A cartridge casing 20 of the optical disk cartridge 2 has a shutter 21. A shutter open/close arm 22 is attached to an end of the shutter 21. A write-protect tab 23 used to write-protect an optical disk is implanted in one corner of the cartridge casing 20.

When the optical disk cartridge 2 is, as described in conjunction with FIG. 7, inserted in a direction of arrow C into the slot 61 of the load/ejection mechanism 60, an end 22A of the shutter open/close arm 22 is pressed by the open/close arm 38. This causes the shutter 21 to slide on the cartridge casing 20. Consequently, the illustrated state is attained. An optical disk 24, that is a data recording medium, is stowed in the cartridge casing 20. The optical disk 24 has a hub 25 thereof, which is located in the center of the optical disk, chucked with the turntable 13 of the spindle motor 14, and then rotates. When the optical disk cartridge 2 is inserted into the optical disk drive unit 100, the spindle motor 14 rotates the optical disk 24, or in other words, the spindle motor 14 incurs a load. Moreover, when the shutter 21 is fully open, a holding groove 26 for holding a shutter open/close piece becomes visible at the distal edge of the cartridge casing 20. Furthermore, two reference holes 27 and 28 are bored on both sides near the rear edge of the cartridge casing 20 on the bottom thereof. The reference hole 27 is round, while the other reference hole 28 is oblong.

Figure 21B:
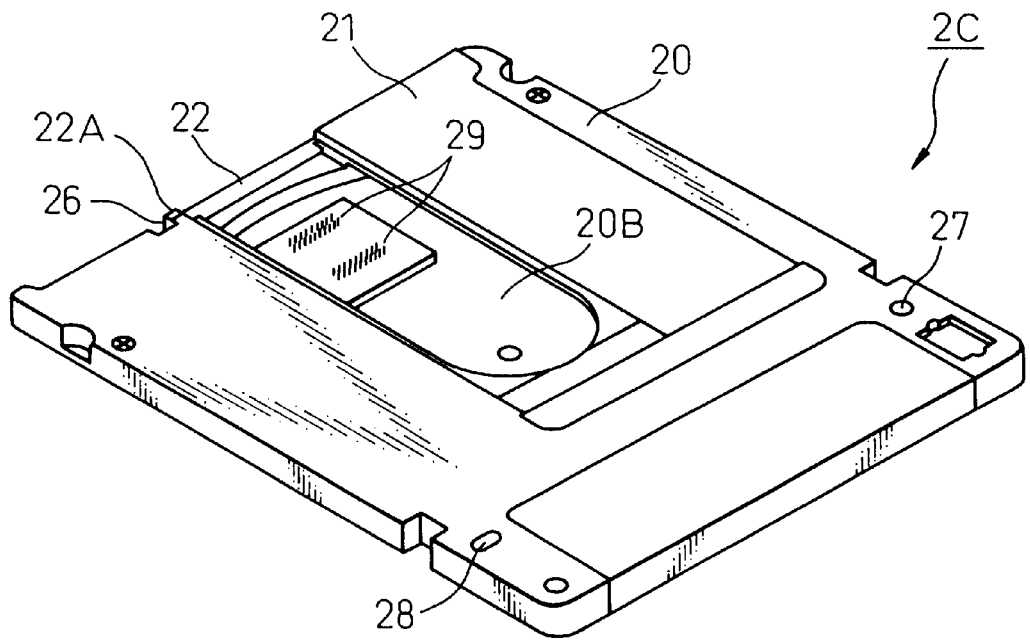
FIG. 21B is an oblique view showing the structure of an optical disk cleaning cartridge.

Aside from the optical disk cartridge 2 having the foregoing structure, a cleaning cartridge 2C shown in FIG. 21B for cleaning the objective mounted on the carriage 81 is locally procurable. The cleaning cartridge 2C has, like the optical disk cartridge 2, the shutter 21, shutter open/close arm 22, holding groove 26, and reference holes 27 and 28 formed as parts of the cartridge casing 20. The cleaning cartridge 2C accommodates no optical disk. The write-protect tab 23 for write-protecting an optical disk is therefore not implanted at one corner of the cartridge casing 20. In contrast, a cleaning brush 29 is placed on the bottom 20B of the cartridge casing 20 of the cleaning cartridge 2C.

The cleaning brush 29 is fixed to the bottom 20B of the cartridge casing 20. When the cleaning cartridge 2C is inserted into the optical disk drive unit 100, the carriage 81 of the movable optical assembly 80 is reciprocated on the cleaning brush 29. Due to the reciprocation of the carriage 81, the objective mounted on the carriage 81 is cleaned by the cleaning brush 29.

When a cartridge is inserted into the optical disk drive unit 100, the optical disk drive unit 100 must recognize whether the cartridge is the optical disk cartridge 2 or cleaning cartridge 2C. Moreover, when the optical disk cartridge 2 is inserted into the optical disk drive unit, the optical disk drive unit 100 must recognize based on the position of the write-protect tab 23 whether the optical disk is write-protected. The conventional optical disk drive unit 1 has therefore, as shown in FIG. 4 or FIG. 6, three switches included in the cartridge identification switch 19.

According to the present invention, as shown in FIG. 7, the cartridge identification switch 19 consists of two switches 19A and 19B alone. The two switches 19A and 19B are used to recognize whether the optical disk cartridge 2 is write-protected. In other words, according to the present invention, a switch for identifying the cleaning cartridge 2C is not included.

According to the present invention, insertion of the cleaning cartridge 2C into the optical disk drive unit 100 is detected based on a startup time required by the spindle motor 14 without use of the cartridge identification switch 19. The startup time is determined with the number of rotations made by the spindle motor 14 immediately after a cartridge is inserted into the optical disk drive unit 100. In general, the spindle motor 14 is activated immediately after the optical disk cartridge 2 is inserted into the drive unit. As mentioned previously, when the optical disk cartridge 2 is inserted into the optical disk drive unit 100, the spindle motor 14 rotates the optical disk, or in other words, the spindle motor incurs a load. It therefore takes a predefined time until activation of the spindle motor 14 is completed after the optical disk cartridge 2 is inserted into the optical disk drive unit 100.

By contrast, when the cleaning cartridge 2C is inserted into the optical disk drive unit 100, since the cleaning cartridge 2C has no optical disk, the spindle motor 14 incurs no load during activation. The spindle motor 14 therefore rotates idly. When the cleaning cartridge 2C is inserted into the optical disk drive unit 100, activation of the spindle motor 14 is completed in a time shorter than the predefined time. The time required for completing activation of the spindle motor 14 is monitored immediately after a cartridge is inserted into the optical disk drive unit 100. It can thus be detected whether the cleaning cartridge 2C has been inserted into the optical disk drive unit 100. This control is given using the circuits mounted on the printed wiring board 3 connected to the spindle motor 14.

According to the present invention, since the foregoing control is given, one detection switch can be excluded from the cartridge identification switch 19. Consequently, the number of parts can be decreased and the cost can be reduced

What is claimed is:

1. An optical data storage apparatus for at least optically reproducing information from a storage medium stowed in a cartridge, comprising:
   an optical mechanism unit for at least reading information from said storage medium by using a light beam, and a load/ejection unit for loading said cartridge in said optical storage apparatus or for ejecting said cartridge from said optical storage apparatus;
   said optical mechanism unit including;
      a base;
      a carriage movably mounted in the center portion of said base for irradiating a light beam on a predetermined position of said storage medium;
      a light emitting portion mounted on one end of said base for emitting a light beam;
      a groove formed on said base as a light passage for leading said light beam emitted from said light emitting portion to said storage medium and for leading a light beam returning from said storage medium to an optical sensor;
      optical components positioned in said groove for leading a light beam returning from said storage medium to an optical sensor; and
      a motor mounted on the other end of said base for rotating said storage medium;
   said load/ejecting unit having:
      a bottom plate for fixing said base;
      a load/ejecting mechanism of said cartridge; and
      a top plate for holding said cartridge;
      wherein said optical mechanism unit and said load/ejecting unit are separably united into one body;
      wherein said groove is formed in the shape of letter L having a first groove extending in moving directions in which said carriage moves and a second groove extending in a direction orthogonal to the moving directions of said carriage, wherein a collimator lens and a beam splitter are placed in said first groove and a Wollaston prism and condenser lens are placed in said second groove.

2. An optical data storage apparatus according to claim 1, wherein a mounting portion for said collimator lens is provided in said first groove and a mounting portion for said condenser lens is provided in said second groove, and said two mounting portions are formed to be planes whose dimensions are precise.

3. An optical data storage apparatus according to claim 1, wherein a cover for covering at least said carriage, said groove, and said motor is provided on said base.

4. An optical data storage apparatus according to claim 1, wherein a signal line for driving said carriage included in said optical mechanism unit and a signal line for driving said motor are integrated into one flexible cable or cable and then linked to said printed wiring board.

5. An optical data storage apparatus according to claim 1, wherein a motor assembly included in said optical mechanism unit has a temperature sensor for detecting the internal temperature of the apparatus.

6. An optical data storage apparatus according to claim 1, wherein a spindle motor assembly included in said optical mechanism unit has a position sensor for detecting the home position of said carriage included in said movable optical assembly.

7. An optical data storage apparatus for at least optically reproducing information from a storage medium stowed in a cartridge, comprising:
   an optical mechanism unit for at least reading information from said storage medium by using a light beam, and a load/ejection unit for loading said cartridge in said optical storage apparatus or for ejecting said cartridge from said optical storage apparatus;
   said optical mechanism unit including;
      a base;
      a carriage movably mounted in the center portion of said base for irradiating a light beam on a predetermined position of said storage medium;
      a light emitting portion mounted on one end of said base for emitting a light beam;
      a groove formed on said base as a light passage for leading said light beam emitted from said light emitting portion to said storage medium and for leading a light beam returning from said storage medium to an optical sensor;
      optical components positioned in said groove for leading a light beam returning from said storage medium to an optical sensor; and
      a motor mounted on the other end of said base for rotating said storage medium;
   said load/ejecting unit having:
      a bottom plate for fixing said base;
      a load/ejecting mechanism of said cartridge; and
      a top plate for holding said cartridge;
      wherein said optical mechanism unit and said load/ejecting unit are separably united into one body;
      wherein magnetic circuits for driving said carriage included in said movable optical assembly along tracks on said commutative medium within said optical mechanism unit are each composed of a center yoke and a side yoke having a permanent magnet attached thereto, wherein said center yoke is fixed to the base of said optical mechanism unit using screws, wherein portions of said side yoke that join said center yoke each have a hole in which the head of the screw is stowed, and wherein said side yoke is aligned with said center yoke using the heads of the screws.

8. An optical data storage apparatus for at least optically reproducing information from a storage medium stowed in a cartridge, comprising:
   an optical mechanism unit for at least reading information from said storage medium by using a light beam, and a load/ejection unit for loading said cartridge in said optical storage apparatus or for ejecting said cartridge from said optical storage apparatus;
   said optical mechanism unit including;
      a base;
      a carriage movably mounted in the center portion of said base for irradiating a light beam on a predetermined position of said storage medium;
      a light emitting portion mounted on one end of said base for emitting a light beam;
      a groove formed on said base as a light passage for leading said light beam emitted from said light emitting portion to said storage medium and for leading a light beam returning from said storage medium to an optical sensor;
      optical components positioned in said groove for leading a light beam returning from said storage medium to an optical sensor; and
      a motor mounted on the other end of said base for rotating said storage medium;
   said load/ejecting unit having:
      a bottom plate for fixing said base;
      a load/ejecting mechanism of said cartridge;

a top plate for holding said cartridge;

wherein said optical mechanism unit and said load/ejecting unit are separably united into one body; and a mechanism for fixing said motor to the base of said optical mechanism at three points, wherein said fixing mechanism consists of:

three legs equidistantly jutting out from the seating of said spindle motor and each having a screw passage hole bored therein;

screw holes bored in the base of said optical mechanism unit at positions at which the screw holes are opposed to the screw passage holes of said legs;

a reference plane formed around one of said screw holes bored in said base; and three pairs of pressurizing members and screws that have the same sizes, wherein one of said three legs is higher by the height of said pressurizing member than the other legs;

the one leg is used as a reference point in height, placed on said reference plane, pressurized with said pressurizing member and screw, and then fixed to said base;

the other two legs are fixed to said base using said screws with said pressurizing members between said legs and said base; and a magnitude of tightening of the two screws is adjusted in order to adjust the slope of said turntable of said motor.

9. An optical data storage apparatus according to claim 8, wherein said screw passage holes are bored so that a triangle drawn with the centers of said screw passage holes of said three legs as vertices will be an isosceles triangle having the center of said screw passage hole in said reference plane as a vertex screw passage hole in said reference plane as a vertex thereof.

10. An optical data storage apparatus according to claim 8, said screw passage holes are bored so that a triangle drawn with the centers of said screw passage holes of said three legs as vertices will be an equilateral triangle having the center of said screw passage hole in said reference plane as a vertex thereof and having the center of rotation of said motor as the center of gravity thereof.

11. An optical data storage apparatus for at least optically reproducing information from a storage medium stowed in a cartridge, comprising:

an optical mechanism unit for at least reading information from said storage medium by using a light beam, and a load/ejection unit for loading said cartridge in said optical storage apparatus or for ejecting said cartridge from said optical storage apparatus;

said optical mechanism unit including;

a base;

a carriage movably mounted in the center portion of said base for irradiating a light beam on a predetermined position of said storage medium;

a light emitting portion mounted on one end of said base for emitting a light beam;

a groove formed on said base as a light passage for leading said light beam emitted from said light emitting portion to said storage medium and for leading a light beam returning from said storage medium to an optical sensor;

optical components positioned in said groove for leading a light beam returning from said storage medium to an optical sensor; and a motor mounted on the other end of said base for rotating said storage medium;

said load/ejecting unit having:

a bottom plate for fixing said base;

a load/ejecting mechanism of said cartridge; and a top plate for holding said cartridge;

wherein said optical mechanism unit and said load/ejecting unit are separably united into one body; and wherein, a judging means for judging a time required for completing activation of said spindle motor immediately after said cartridge is loaded in said load/ejection unit is included in a control circuit that is mounted on said printed writing board for controlling the number of rotations to be made by said spindle motor of said optical mechanism unit, and wherein, when the time required for completing activation of said spindle motor is short, said judging means judges that said cartridge is a cleaning cartridge.

* * * * *